US012656277B2

(12) United States Patent
Bastian et al.

(10) Patent No.: US 12,656,277 B2
(45) Date of Patent: Jun. 16, 2026

(54) ARTIFICIAL INTELLIGENCE ANOMALY DETECTION USING X-RAY COMPUTED TOMOGRAPHY SCAN DATA

(71) Applicant: Lumafield, Inc., Cambridge, MA (US)

(72) Inventors: Andreas Linas Bastian, San Francisco, CA (US); Daniel Micah Pipe-Mazo, Redondo Beach, CA (US); Anne Winnefeld Sandman, Los Altos Hills, CA (US)

(73) Assignee: Lumafield, Inc., Cambridge, MA (US)

( * ) Notice: Subject to any disclaimer, the term of this patent is extended or adjusted under 35 U.S.C. 154(b) by 0 days.

(21) Appl. No.: 19/182,200

(22) Filed: Apr. 17, 2025

(65) Prior Publication Data

US 2025/0244261 A1 Jul. 31, 2025

Related U.S. Application Data

(63) Continuation-in-part of application No. PCT/US2023/035542, filed on Oct. 19, 2023.

(Continued)

(51) Int. Cl.
*G06T 7/136* (2017.01)
*G01N 23/046* (2018.01)
(Continued)

(52) U.S. Cl.
CPC ......... *G01N 23/046* (2013.01); *G06T 7/0004* (2013.01); *G06T 7/136* (2017.01);
(Continued)

(58) Field of Classification Search
CPC ......... G01N 23/046; G01N 2223/1016; G01N 2223/419; G06T 7/0004; G06T 7/136; G06T 7/60
(Continued)

(56) References Cited

U.S. PATENT DOCUMENTS

2019/0325570 A1 10/2019 Wenzel et al.
2022/0035961 A1 2/2022 Ziabari et al.

OTHER PUBLICATIONS

Potter et al., "Automatic detection of defects in high reliability as—built parts using x-ray CT," Proceedings of SPIE ISSN 0277-786X, Aug. 20, 2020, 11511, 17 pages.*

(Continued)

*Primary Examiner* — Sheela C Chawan
(74) *Attorney, Agent, or Firm* — Fish & Richardson P.C.

(57) ABSTRACT
Provided herein are methods, apparatuses, computer program products, and systems for anomaly detection using machine learning models. One method can include obtaining X-ray computed tomography (CT) scan data for a scan object of a predetermined object type; producing derived data from the X-ray CT scan data, wherein the derived data reveals at least one interior structure usable for anomaly detection in objects of the predetermined object type; inputting at least the derived data into a machine learning model, which has been trained using at least derived data produced from prior X-ray CT scan data for objects of the predetermined object type; receiving an output from the machine learning model that indicates that at least one anomaly has been detected for the scan object; and providing an output to a physical device based on the at least one anomaly having been detected for the scan object.

30 Claims, 18 Drawing Sheets

Related U.S. Application Data

(60) Provisional application No. 63/417,469, filed on Oct. 19, 2022.

(51) Int. Cl.
   *G06T 7/00*          (2017.01)
   *G06T 7/60*          (2017.01)

(52) U.S. Cl.
   CPC ........ *G06T 7/60* (2013.01); *G01N 2223/1016* (2013.01); *G01N 2223/419* (2013.01)

(58) Field of Classification Search
   USPC ................................................. 382/100, 152
   See application file for complete search history.

(56)                References Cited

OTHER PUBLICATIONS

Patrick Fuchs et al. "Defect detection in CT scans of cast aluminum parts : A machine vision perspective," Neuro computing, Sep. 1, 2021,453:85-96.*

Fuchs et al. "Defect detection in CT scans of cast aluminum parts: A machine vision perspective," Neurocomputing, Sep. 1, 2021, 453:85-96.

International Search Report and Written Opinion in International Appln. No. PCT/US2023/035542, mailed Jan. 2, 2024, 13 pages.

Reedy et al., "High-resolution micro-CT with 3D image analysis for porosity characterization of historic bricks," Heritage Science, Biomed Central Ltd, London, UK, Jun. 13, 2022, 10(1):1-22.

Su et al., "Multi-view Convolutional Neural Networks for 3D Shape Recognition," Paper, Proceedings of the IEEE International Conference on Computer Vision (ICCV), 2015, 945-953.

* cited by examiner

*1601* — Providing an input data set comprising X-ray CT scan data, data derived from the X-ray CT scan data, at least one feature derived from the X-ray CT scan data, or a combination thereof

*1602* — Labeling at least one input datum of the input data set as nominal or anomalous

*1603* — Training a machine learning algorithm to distinguish between nominal and anomalous input datum Inputting X-ray CT scan data of a scan object, data derived from the X-ray CT scan data, at least one feature (e.g., porosity, wall thickness, dimensional deviation, inclusions, boundary representations, 3D convolutional features, voxels, octree, point cloud, mesh, implicit function, and spherical harmonics) derived from the X-ray CT scan data, or a combination thereof, into a trained model

*1701*

Detecting at least one anomaly

*1702*

Post-detection processing based on the detected anomaly (e.g., making an inline decision, rendering a result to a display device, detecting a scan object as a counterfeit, detecting a change, quantifying a production metric, and assigning a label)

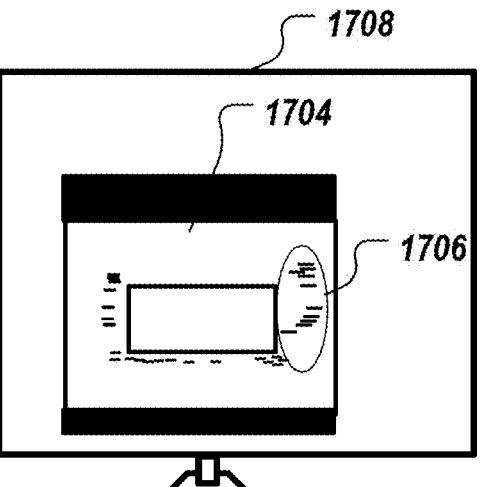

*1708*

*1704*

*1706*

CHANGES 1710

- Chang to a production machine (e.g., wear and tear, calibration change, or root cause of anomaly)
- Change in a supply chain (e.g., vendor change, parameter change, or material change),
- Drift in product quality
- Variance in production lines

ARTIFICIAL INTELLIGENCE ANOMALY DETECTION USING X-RAY COMPUTED TOMOGRAPHY SCAN DATA

CROSS-REFERENCE TO RELATED APPLICATIONS

This patent application claims priority to and the benefit of U.S. Provisional Patent Application No. 63/417,469, filed on Oct. 19, 2022, and PCT application No. PCT/US2023/035542, filed on Oct. 19, 2023, which are incorporated herein by reference in their entirety.

FIELD

The present disclosure relates to methods, systems, and apparatuses for detecting anomalies using X-ray computed tomography (CT) radiographs, reconstructions, renderings, and derivative data.

BACKGROUND

It is often difficult to determine the provenance of, or differences between, manufactured goods that appear identical on the surface. For example, counterfeit products are designed to mimic the appearance and feel of their authentic counterparts, making it difficult to distinguish between the two without a more exhaustive, and sometimes destructive, inspection of the interior. In addition to causing significant economic damage, counterfeit products can also present hazards to health and safety since they frequently do not conform to safety standards. For example, counterfeit lithium-ion batteries can present high risks of exploding, while counterfeit safety airbags can fail to properly deploy, if at all. From a manufacturing standpoint, it can be difficult to quickly and accurately perform quality control measures without costly labor and destruction of manufactured goods.

X-ray CT is a technique that can image the interior features and structures of such manufactured goods. However, current methods of using X-rays for inspection, including two-dimensional (2D) X-ray imaging methods, as well as 2D visible light imaging methods, are inadequate for detecting differences between goods that appear identical from the outside, including counterfeit and/or defective goods.

SUMMARY

Set forth herein are methods of training artificial intelligence (AI) models, and methods of using trained AI models to detect differences between manufactured goods, or the parts and components thereof, in which the goods, parts, or components appear similar from the outside. Set forth herein are solutions to the aforementioned problem as well as others in the field to which certain implementations described herein pertain.

In some example embodiments, set forth herein are methods for training a machine learning model, comprising: providing an input data set comprising X-ray CT scan data, data derived from the X-ray CT scan data, at least one feature derived from the X-ray CT scan data, or a combination thereof; and training a machine learning model to distinguish between nominal and anomalous input datum.

In various example embodiments, set forth herein are methods for anomaly detection, comprising: inputting X-ray CT scan data, data derived from the X-ray CT scan data, at least one feature derived from the X-ray CT scan data, or a combination thereof, into a trained machine learning model; and detecting at least one anomaly.

BRIEF DESCRIPTIONS OF THE DRAWINGS

FIG. 17 illustrates an example of a flow diagram of another method according to certain embodiments.

DETAILED DESCRIPTION

I. Introduction

Figures 1A, 1B, 1C:
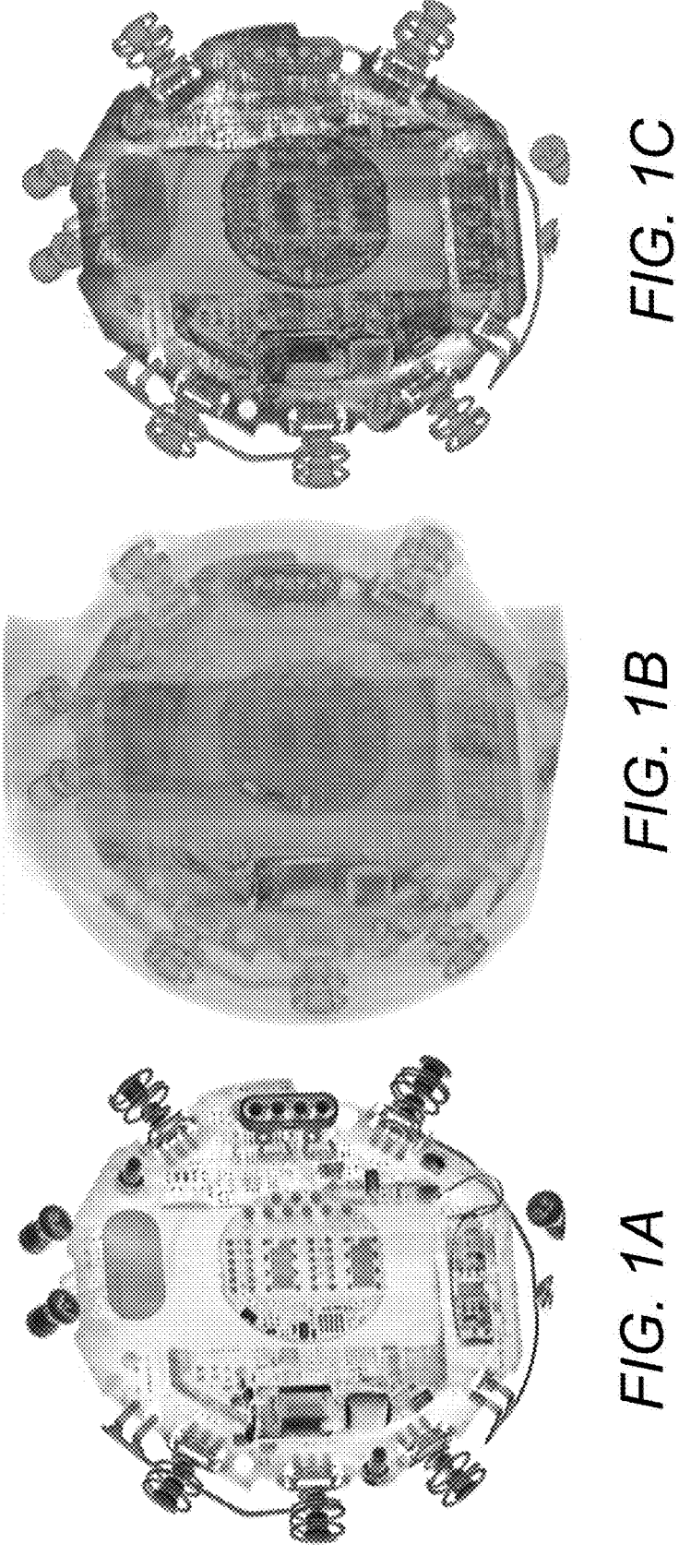
FIG. 1A depicts a black and white photograph of material properties according to their raw attenuation values.
FIG. 1B depicts a black and white photograph of low-density materials included in FIG. 1A.
FIG. 1C depicts a black and white photograph of the low-density materials in FIG. 1B as removed to reveal additional internal structure.

Set forth herein are methods for using AI and machine learning for anomaly detection, authentication, defect detection, and other commercially relevant tasks.

In some example embodiments, the methods can include data sources such as, but not limited to, radiographs, 2D slices of reconstructions, three-dimensional (3D) reconstructions, 2D renderings of reconstructions, point clouds, meshes, and other geometric representations sampled from reconstructions.

II. Data Sources

A CT scanner (e.g., CT scanning device 1800) can acquire a set of 2D images from an image detector (e.g., detector 1806). These images can represent the amount of X-ray energy that the image detector detects. The X-ray energy, which can be emitted from an X-ray source (e.g., X-ray source 1803), can contain distinct energies that can be subsequently attenuated by any matter (e.g., scan target) between the X-ray source and the image detector. The difference in X-ray energy emitted by the X-ray source and the X-ray energy captured by the image detector can provide information about the materials and densities of materials of the matter within the path of the X-ray photons.

The image acquired from the image detector can be referred to as a radiograph, which can represent the raw data from the image detector and/or can include computer vision (CV) post-processing techniques such as denoising, deblurring, etc. Henceforth, the term "2D radiograph" can refer to either the direct data from the image detector, or the data that has undergone standard CV post-processing techniques to improve the quality of the image.

A CT scan commonly utilizes a method where multiple 2D radiographs of a single item are acquired, where the primary difference between the system configuration for each 2D radiograph is the orientation or location of the scan target relative to the X-ray source and the image detector. In one example, the scan target can be placed between the X-ray source and the image detector on a mechanical turntable. The mechanical turntable can rotate in fixed steps that can sum to a 360° revolution, and can stop after each step to acquire a radiograph, so that the resulting set of 2D radiographs include images from multiple vantage points around the object. In one example, the scan target can rotate exactly one degree between each 2D radiograph, thus making a full CT scan comprise 360 radiographs.

In some embodiments, set forth herein is a process of X-ray CT scanning, wherein the methods produce a 3D image of a scanned target or targets. This 3D image can be a reconstruction derived from a series of 2D X-ray radiographs. Unlike visible light or 2D X-ray radiography, a 3D reconstruction can provide dimensionally accurate spatial and material information about both the inside and outside of scan target or targets, or a part or component thereof.

Before being input to the 3D reconstruction algorithm, the radiographs can be further processed in a number of ways.

In some embodiments, the radiographs can be summed (i.e., combined) and/or averaged before being reconstructed to produce a 3D reconstruction.

The X-ray CT scanner settings used to acquire a scan (herein "acquisition settings") that produce the aforementioned radiographs, as well as associated metadata about the scan, can include various sources of data, and can be used in combination with a trained model for anomaly detection. In some example embodiments, the trained model can be a trained machine learning model.

As used herein, the phrase "scan data" can refer to a combination of 2D X-ray radiographs, 3D reconstructions, acquisition settings, metadata, reconstruction data, or a combination thereof.

In some embodiments, including any of the foregoing, the X-ray CT scan data can be selected from the group consisting of radiographs, acquisition settings, reconstruction data, rendering data, or a combination thereof.

a. Derived Data Sources and Features

In some embodiments, X-ray CT scan data can be used as an input to a machine learning model or algorithm or process which produces "derived data." These other types of data and features can be used as input data, specific features, or a combination thereof, for training machine learning models. Examples of derived data include 2D renderings of 3D reconstructions, 2D slices of 3D reconstructions, and 3D data from reconstructions.

b. 2D Renderings of 3D Reconstructions

In some example embodiments, 2D images of reconstruction data can be generated by rendering images using different mappings of attenuation values to different colors/opacities. In various example embodiments, 2D images can also be generated from different perspectives. These different perspectives can produce multiple images of the same part. In certain example embodiments, rendering settings and view perspectives can be combined to provide unique views of interior structures of parts while encoding information about the materials composing the part.

Figure 2C:
FIG. 2C depicts a black and white photograph of rendering another three-dimensional view of a reconstruction from a virtual camera vantage point of the smart watch with specific rendering settings.
Figure 2B:
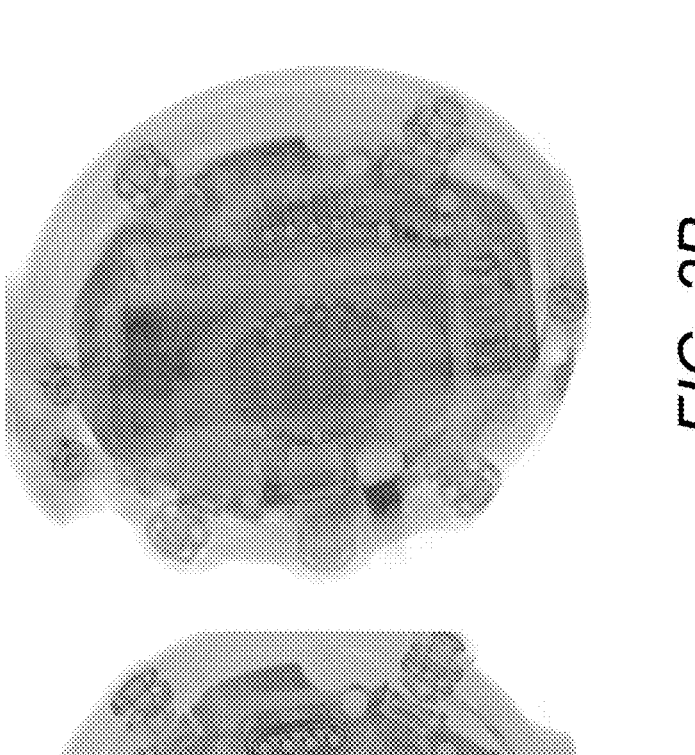
FIG. 2B depicts a black and white photograph of rendering another three-dimensional view of a reconstruction from a virtual camera vantage point of the smart watch with specific rendering settings.
Figure 2A:
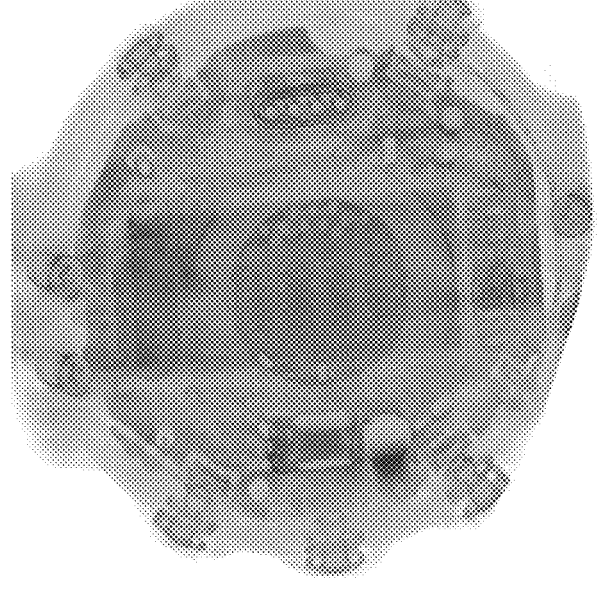
FIG. 2A depicts a black and white photograph of rendering a three-dimensional view of a reconstruction from a virtual camera vantage point of a smart watch with specific rendering settings.

FIGS. 1A-C and FIGS. 2A-C depict example renderings of the reconstruction of a scan of a smart watch using different rendering settings. Specifically, FIG. 1A depicts the smart watch with a subset of attenuation values in which air and polymers are not visible, FIG. 1B depicts the same reconstruction data with a subset of attenuation values that include polymers mapped to different grayscale values, and FIG. 1C depicts the same reconstruction data with polymer values excluded and a different mapping of attenuation values to grayscale values. In some embodiments, the rendering settings can include lower attenuation values so that the plastic enclosure of the watch is visible, while in other cases, the renderings can omit lower attenuation values, resulting in rendered images that more clearly reveal the watch's internal structure. FIGS. 2A-C depict different 3D views of a reconstruction using specific rendering settings in which the virtual camera is placed to achieve different vantage points that reveal different internal features of the smart watch.

c. 2D Slices of 3D Reconstructions

In some example embodiments, 3D reconstruction data can be sampled to create 2D images commonly referred to as "slices." The sampling surface is typically planar, but can be any surface of any shape, including helical, cylindrical, conical, spherical, or a T-spline/non-uniform rational B-spline (NURBS) surface. Slices can be sampled following the coordinate system formed during scan acquisition, or can be aligned to other coordinate systems, including user-defined coordinate systems or those derived from geometric features extracted from the scan, such as principal axes or fit primitives.

Figures 3A, 3B:
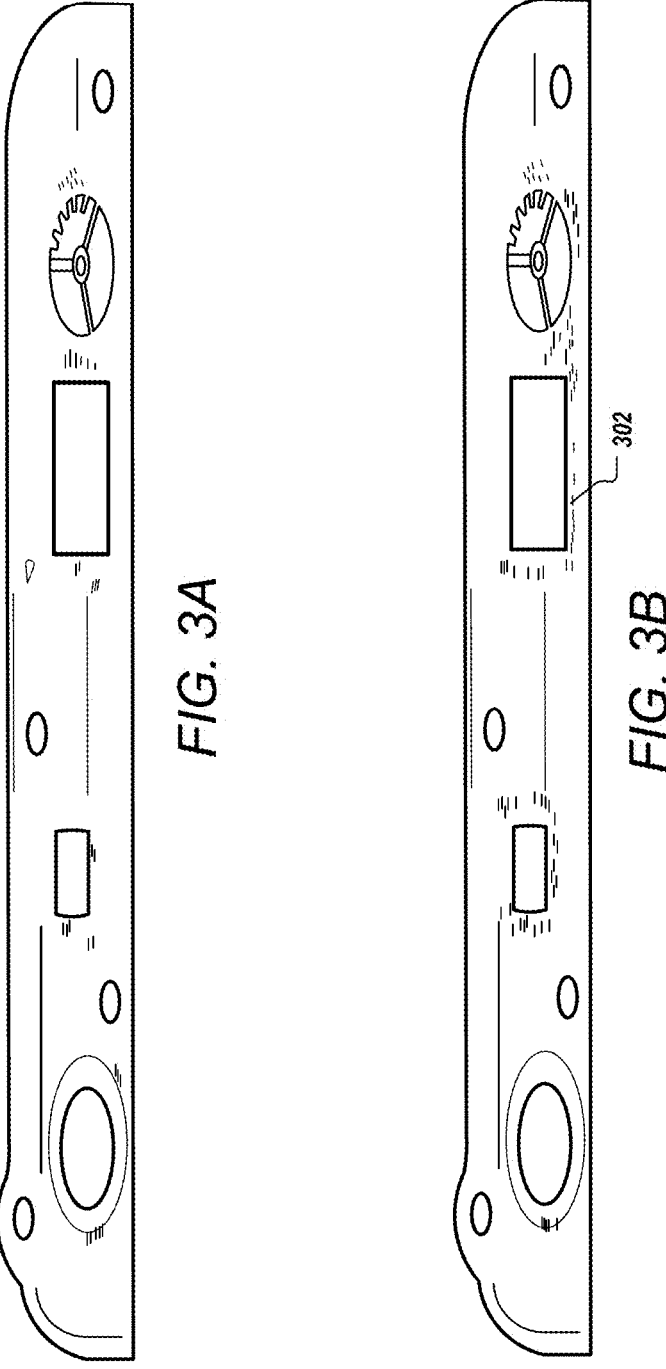
FIG. 3A depicts a black and white photograph of 2D slices aligned to a coordinate system that reveals distinguishing features internal to a scanned part.
FIG. 3B depicts another black and white photograph of 2D slices aligned to a coordinate system that reveals distinguishing features internal to the scanned part.

FIGS. 3A-B depict example slices of different instances of the same manufactured object (e.g., multiple parts with the same manufacturer SKU for an automotive part), wherein the slices are derived from a 3D reconstruction of a scan of each instance. In this example, the part is an automotive pressure control valve assembly, and the two instances are the same assembly produced by two different vendors. The slice can be derived from a region of the 3D reconstruction data which captures an ultrasonic weld between two plastic components. The defects being inspected in these slices are pores (i.e., small bubbles of air present in the ultrasonic weld). FIG. 3A depicts few defects (i.e., pores) in the weld; in contrast, FIG. 3B reveals numerous defects (i.e., pores 302). Thus, the slice depicted in FIG. 3B effectively captures the weld feature and defects therein.

d. 3D Data from 3D Reconstructions

In some example embodiments, 3D representations of boundaries and volumes can be derived from reconstruction data, including, but not limited to triangular and quadrilateral surface meshes; volumetric (e.g., tetrahedral) meshes; point clouds; octrees; occupancy grids; implicit functions (e.g., neural implicit functions); and spherical harmonics.

In some example embodiments, shape representations can be derived in a one-to-one correspondence with a reconstruction (e.g., one mesh per reconstruction). In other example embodiments, multiple shape representations can be derived from a single reconstruction (e.g., multiple meshes from a reconstruction). In certain example embodiments, the shape representations can be derived using different segmentations based on an attenuation value or other structural properties of the reconstruction to encode additional information about material properties.

Figure 4C:
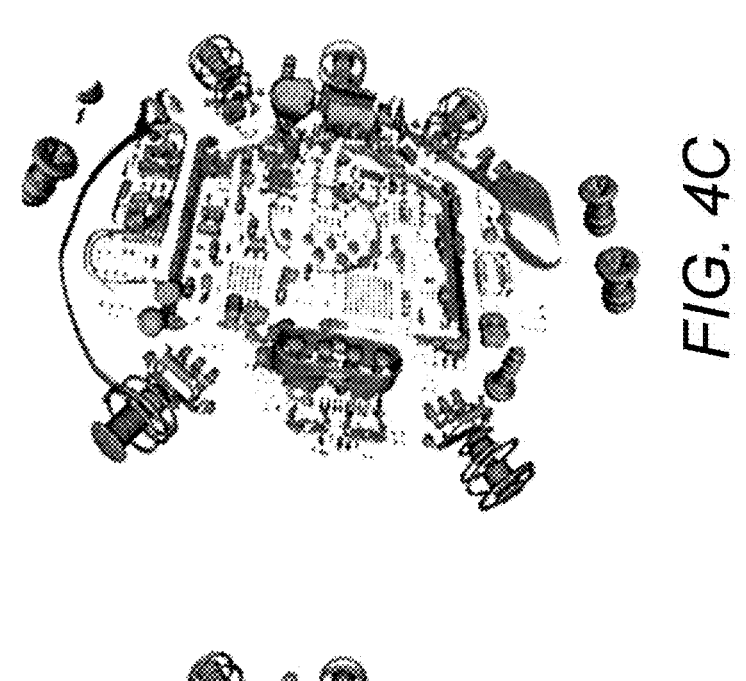
FIG. 4C depicts a black and white photograph of another mesh extracted from the same reconstruction that captures additional information about the materials composing the scanned object.
Figure 4B:
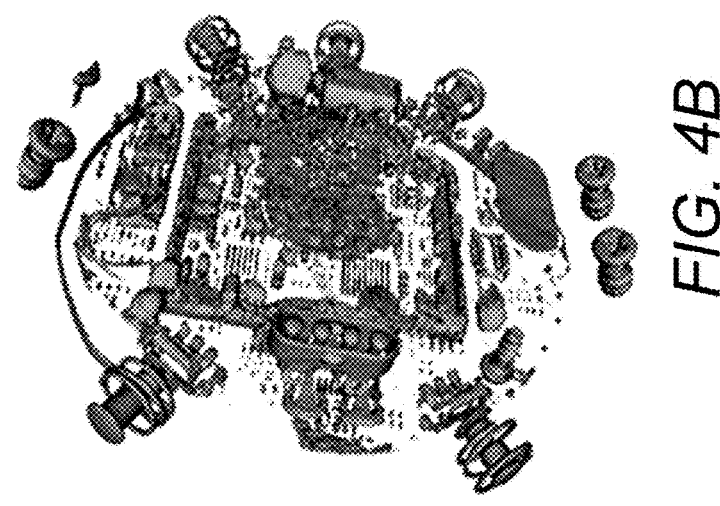
FIG. 4B depicts a black and white photograph of another mesh extracted from the same reconstruction that captures additional information about the materials composing the scanned object.
Figure 4A:
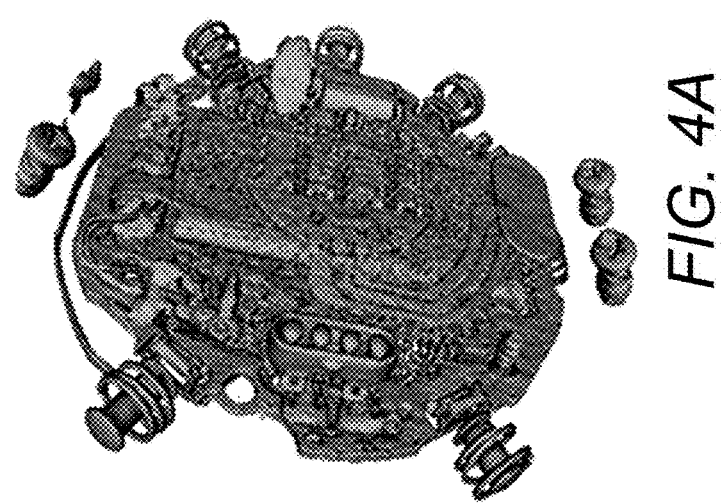
FIG. 4A depicts a black and white photograph of a mesh extracted from the same smart watch reconstruction that captures additional information about the materials composing the scanned object.

FIGS. 4A-C illustrate multiple meshes extracted from the same reconstruction. The boundaries used to generate a mesh (or other shape representations) can be generated via a number of different segmentation methods, including but not limited to global thresholding, adaptive thresholding, or Otsu thresholding (i.e., distinguishing foreground pixels from background pixels). The segmentation can also be achieved via a trained machine learning model (e.g., random forest classifier, U-net (i.e., convolutional neural network (CNN) associated with biomedical image segmentation), or another trained CNN). The segmentations used to create multiple derivative pieces of data from a reconstruction can be determined manually by setting a threshold, or automatically by allowing the threshold to be automatically chosen or determined by an algorithm. In some embodiments, the segmentation can be tuned to specific features in the data (i.e., known material peaks).

e. Generated Analytic Features

In some example embodiments, specific features can be generated by additional algorithmic processing of reconstruction data. In various embodiments, the algorithmic processing of reconstruction data can be performed automatically, while in certain embodiments, the algorithmic processing of reconstruction data can be performed in response to human input.

In some implementations, feature data of voids or contaminants detected in X-ray CT scan data for a scan object can be provided as an input into a machine learning model. The machine learning model can generate an output that indicates at least one anomaly that has been detected for the scan object. An output can be provided to a physical device based on the at least one anomaly detected for the scan object based on the feature data of voids or contaminants. The output can include a change in an upstream process or a change in a vendor in a supply chain determined based on the at least one anomaly. For example, porosity anomalies and/or inclusion anomalies can be used to detect changes in upstream processes or vendors in a supply chain.

Various example embodiments can include additional features, such as porosity (i.e., ratio of volume of void to total volume or total number of detected pores) data, which can be selected from any combination of porosity location; porosity size; porosity shape; porosity distance to surface; porosity cluster density; porosity count; or porosity sphericity. In some implementations, a scan object can be manufactured by molding, bonding, or sealing. Porosity data of one or more pores detected in the X-ray CT scan data for the scan object can be provided as an input to a machine learning model to detect at least one anomaly for the scan object. For example, porosity data can be used to detect anomalies for products made by molding (e.g., injection molding, casting, or metal injection molding) as well as for products that involve bonding or sealing (e.g., sealing composites, weather-proof products, or water-proof products).

Some example embodiments can include inclusions (i.e., contaminants) data, which can be selected from any combination of inclusions location; inclusions size; inclusions shape; inclusions distance to surface; inclusions cluster density; inclusions count; or inclusions sphericity. In some implementations, a scan object can be manufactured using an injection molding process. Inclusion data can be provided as an input to a machine learning model to detect at least one anomaly for the scan object. The at least one anomaly can be used to generate an output characterizing agglomeration in the injection molding process of fiber-filled resins. For example, inclusion data can be used to detect anomalies for products manufactured using a manufacturing process that involves mixing and/or dispersion (concrete or adhesives with particulate components). Inclusion data can be used to characterize agglomerations in injection molding of fiber-filled resins.

In some implementations, porosity anomalies and/or inclusion anomalies can be combined with dimensional anomalies detected though dimensional checks to generate a comprehensive set of features describing a part. In some implementations, a machine learning model can detect a combination of different types of anomalies.

Certain example embodiments can include object wall thickness data, such as but not limited to a distribution of thicknesses.

In certain example embodiments, additional features useful in combination with the disclosure herein include, but are not limited to, at least one of surface area data, surface roughness data, dimensions of features in 2D and 3D, dimensional deviations with respect to a computer-aided design (CAD) model, dimensional deviations with respect to another CT scan, and dimensional deviations on primitive-matched features in 2D and 3D, where a primitive can be a sphere, cube, cylinder, or other basic geometric shape which can either be manually specified by the user or inferred from the 3D reconstruction data. For example, a primitive can be a 2D primitive, such as lines, circles, arcs, or splines, and a primitive can be a 3D primitive, such as planes, cylinders, spheres, cones, or torii. For example, certain example embodiments can include the center-to-center distance of the nominal location of a circular feature in a reconstruction and the location of the circle primitive fit to the scan data. Some example embodiments can include the concentricity of a nominal cylindrical feature and a cylinder primitive fit to scan data. Some example embodiments can include angles constructed from a primitive. In some implementations, dimensional deviation data on the primitive-matched feature can include a plane-to-plane distance.

In some implementations, a machine learning model can generate an output that indicates the at least one anomaly by processing dimensional deviation data on the primitive-match feature using a quality criterion that describes allowable variation of the dimensional deviation data. For example, from one or more 2D or 3D primitives, useful dimension data can be constructed for a scan object, such as center-to-center distances and angles. The dimension data can be used to detect anomalies because many quality and acceptance criteria are specified in terms of allowable variation of dimensions.

In some implementations, a deviation type of the primitive-matched feature can be determined based on the predetermined object type of the scan object, and the dimensional deviation data on the primitive-matched feature can be generated based on the deviation type of the primitive-matched feature. For example, the deviation type of the primitive-matched feature can include a combination of primitives and relationships between the primitives. The deviation type can be determined based on an object type of the scan object, such as an object shape or one or more materials for the scan object. The dimensional deviation data on the primitive-matched feature can be generated based on the deviation type.

f. Other Derived or Detected Features

In some example embodiments, scan data can be used to derive other data. In certain examples, the other derived data can be selected from distributions of reconstruction attenuation values. In certain example embodiments, the other derived data can be selected from distributions of radiograph attenuation values, which can range from 0 to 65535 on a 16-bit unsigned integer scale. In certain example embodiments, the other derived data can be selected from 3D convolutional features extracted from reconstructions (e.g., manually-generated convolutional filters for oriented-edge extraction, such as Sobel or Gabor filters). In certain example embodiments, the other derived data can be selected from 2D convolutional features extracted from reconstruction slices. In some example embodiments, the other derived data can be selected from 2D convolutional features extracted from radiographs. In certain example embodiments, the other derived data can be selected from material peaks in attenuation value histograms (e.g., according to peak-finding algorithms and/or Gaussian fits to a distribution of attenuation values). In certain example embodiments, the other derived data can be selected from volumes of specific domains and/or from centroids of domains. In various example embodiments, the other derived data can be selected from characters such as numbers, text, fiducials, or codes (e.g., barcodes or quick response (QR) codes).

Certain embodiments can include the generation of new features such as, but not limited to, progressive thresholds, boundary representations of different specific materials, and 3D convolutional filters. For example, the derived data from an X-ray CT scan data can include a series of segmentations of the X-ray CT scan data. The series of segmentations can be generated using multiple progressive threshold values that segment different materials from the X-ray CT scan data. The series of segmentations can include segmentation masks, voxels, or meshes that correspond to structures of different materials in the scan data.

III. Tasks

In some example embodiments, AI models can be trained using labeled data, or, in an unsupervised fashion, with unlabeled data using data types and features, such as those described above. The resulting trained models can be used in anomaly detection. In certain embodiments, anomaly detection can include defect detection, authentication, or a combination thereof. In some implementations, defect detection can include assembly verification. The scan object can be an assembly including two or more parts, a system can perform assembly verification based on at least one anomaly detected for the scan object. For example, an assembly is either missing features or components or includes additional features or components. For example, an assembly can include a missing screw or an extra screw. An assembly can have a radius that is or is not present on a molded component. An assembly can include a void or inclusion that is not present in training scan objects for generating the training distribution for training a machine learning model. For example, assembly verification can provide quality assurance of an assembly, e.g., validating that an automotive heating, ventilation, and air conditioning (HVAC) actuator has all of its constituent parts, no extra parts, and that the parts are all in the correct locations.

Various embodiments can include using the results from a trained model set forth herein to make an inline decision on a product handling line, such as a product manufacturing line, a product packaging line, or a product receiving line. For example, a system can include a product handling device, such as a conveyor belt. The system can use the results from a trained machine learning model to make an inline decision on a product receiving line, e.g., for return of goods that were sold or rented.

Some embodiments can include populating a user interface (UI) dashboard of results. In some implementations, the system can render to a display device a result based on an anomaly detected for the scan object in a UI on the display device. In some implementations, the system can highlight a defect or an anomalous region in 2D or 3D in the UI on the display device.

Certain embodiments can include assigning an OK (i.e., meets quality specifications)/no good (NG) (i.e., does not meet quality specifications) label to a universally unique identifier (UUID) corresponding to the specific part, where the universally unique identifier can be randomly generated or can be inferred from an attribute of the part such as a barcode on the part.

In some example embodiments, defect detection can include, but is not limited to, detecting defects inline in a manufacturing system. Certain embodiments can further include generating a decision about the scanned object. For example, the generated decision can change a UI either on the machine or in software receiving data from the machine. The generated decision can be used to intervene in the manufacturing or handling process; for example, a robot or other piece of manufacturing equipment can divert a defective part to a rejection or remediation station once a decision to do so is generated. In some implementations, the system (e.g., a CT scanner) can be in-line to a production line and can be responsible for inspecting a majority or even 100% of items produced in the production line. In some implementations, the system can be adjacent to a production line and can be responsible for inspecting a portion of (e.g., 0-100%) of items produced in the production line. In some implementations, the anomaly detection result can be used to automatically pass or reject an item in a production line. In some implementations, the anomaly detection result can be reviewed by an operator for accuracy before making a decision to pass or reject an item. In certain example embodiments, the generated decision can be shown to a user. In certain embodiments, the user can provide feedback; for example, the user feedback can cause the model to be retrained so that it can improve over time.

In certain example embodiments, the decision and its metadata can be logged to a cloud-based system. For example, the cloud-based system can show time-series data and metrics about the decisions and their history in order to identify product yields over time. In other examples, the cloud-based system can show time-series data and metrics about decisions and their history in order to identify model drift. In yet other example embodiments, the cloud-based system can automatically or, upon user-based initiation, retrain the model based on the data.

In some example embodiments, defect detection can include, but is not limited to, detecting counterfeit goods, authenticating goods, or a combination thereof.

In various example embodiments, defect detection can include, but is not limited to, detecting counterfeit artwork, authenticating artwork, or a combination thereof.

In certain example embodiments, defect detection can include, but is not limited to, creating a digital record for one-of-a-kind goods (e.g., unique sculptures), thereby allowing tracking and comparison of condition over time.

In certain example embodiments, defect detection can include, but is not limited to, inspecting items which otherwise can be hazardous to inspect via physical processes such as weapons, chemicals, or other products whereby opening the product to inspect it can cause harm to the inspector.

In some example embodiments, defect detection can include, but is not limited to, detecting production machine and tool wear and tear. For example, the defect detection can include detecting wear on an upstream tool, such as a mold or a die.

In various example embodiments, defect detection can include, but is not limited to, detecting machine calibration changes.

In some example embodiments, defect detection can include, but is not limited to, detecting changes in supply chains including, but not limited to, changes in vendors, changes in manufacturing process parameters, and changes in materials. In some embodiments, the methods can include identifying specific vendors. In some embodiments, the methods can include detecting drift in product quality over time. In some embodiments, the methods can include detecting drift in manufacturing processes over time.

In some embodiments, the methods can include inspecting the quality of incoming goods from vendors. For example, the methods can include inspecting before the vendor ships to the purchaser. In various embodiments, the methods can include inspecting before the purchaser accepts the system from the vendor.

In some embodiments, the methods can include detecting variance in production lines running the same product. For example, the methods can include detecting variance in multiple lines in a facility. In some embodiments, the methods can include detecting variance in multiple lines across multiple facilities in a single location. In various embodiments, the methods can include detecting variance in multiple lines across multiple facilities in multiple locations.

In some embodiments, the methods can include detecting the root cause of where a production defect occurred in a manufacturing process. For example, the methods can include inspecting at multiple points/locations during and/or after a manufacturing process. In some embodiments, the methods can include storing the inspection results at each inspection location. In various embodiments, the methods can include showing the results at the various stages to the user so that further investigation can be performed to identify the likely step or location which introduced the failure, defect, or other deviation. For example, the methods can include detecting an upstream process change based on porosity data (e.g., more or less porosity, a change in locations of porosity in a part).

In various embodiments, the methods can include quantifying yield and production metrics for users. In certain embodiments, the methods can include showing these metrics as the result of one or more inspections, across one or more production lines, across one or more facilities, and/or across one or more locations. In some embodiments, the methods can include allowing users to identify anomalies in production processes across many lines, facilities, and locations.

In some embodiments, the AI model herein can include performing the anomaly detection task on a variety of platforms. For example, the anomaly detection can occur on a remote, on-demand computer system (e.g., cloud computing, data center). In various embodiments, the anomaly detection can occur on network edge devices (e.g., scanners and integrated access devices). In some embodiments, the anomaly detection can occur on mobile devices, such as smart phones and tablets. In various embodiments, the anomaly detection can occur on laptop and desktop computers. In various embodiments, the anomaly detection can require a local network or global internet connection between the CT scanner and additional computers which can be utilized for parts of or the entirety of the anomaly detection tasks. In various embodiments, the entire anomaly detection task can be performed on a computer directly attached to or a part of the CT scanner, whereby neither a local network nor global internet connection is required for the CT scanner and its associated computer(s) to perform the anomaly detection task.

In some embodiments, the AI model, herein, can be trained on a variety of platforms. In various embodiments, the AI model can be trained on a remote, on-demand computer system (e.g., cloud computing, data center). In certain embodiments, the AI model can be trained on network edge devices (e.g., scanners and integrated access devices). In various embodiments, the AI model can be trained on a network of edge devices, such as a plurality of scanners. In various embodiments, the AI model training can require a local network or global internet connection between the CT scanner and additional computers which can be utilized for parts of or the entirety of the AI model training process. In various embodiments, the entire AI model training process can be performed on a computer directly attached to or a part of the CT scanner, whereby neither a local network nor global internet connection is required for the CT scanner and its associated computer(s) to perform the AI model training process.

IV. Definitions

Figure 13:
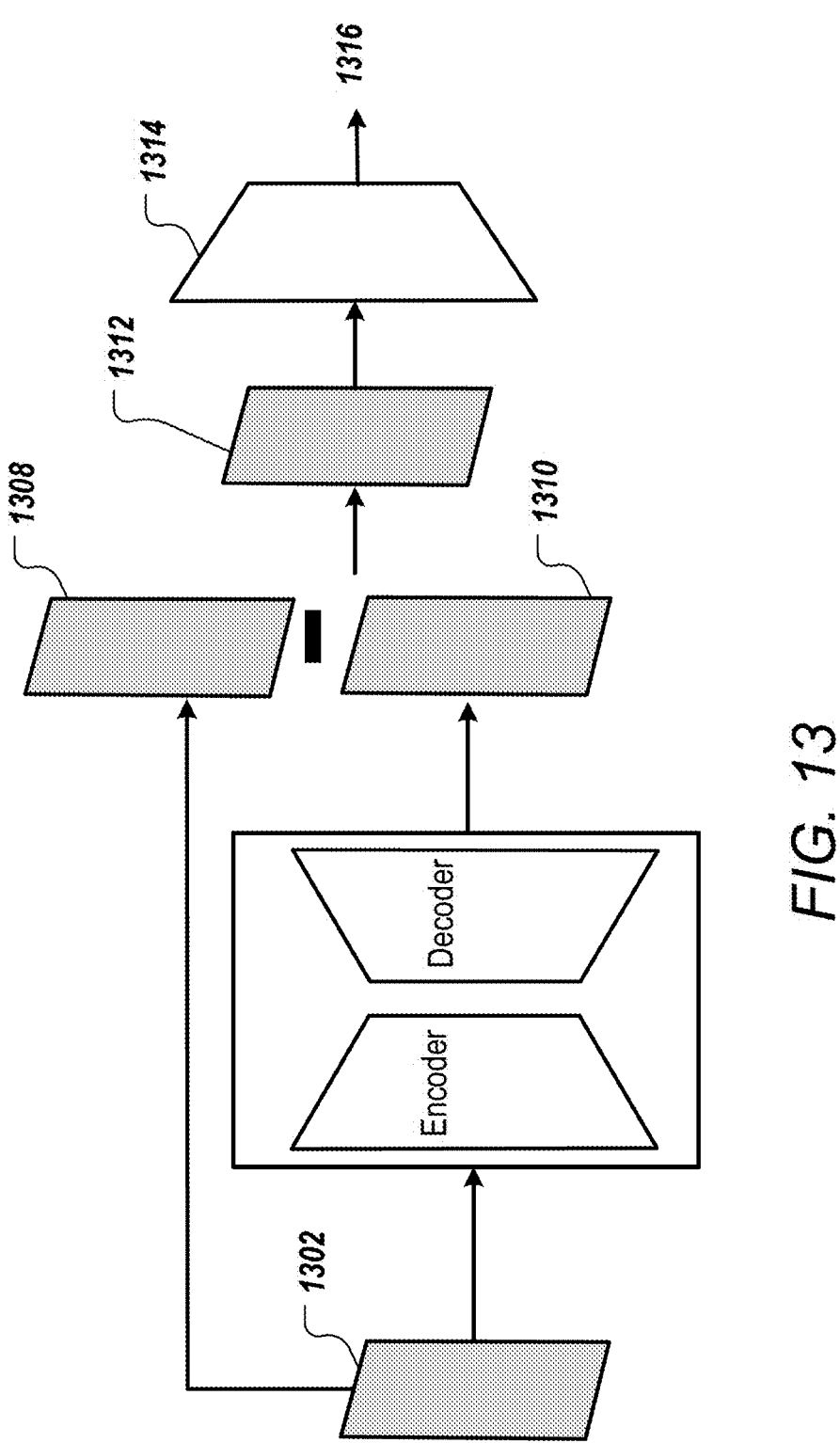
FIG. 13 depicts another method of using a trained autoencoder model to perform anomaly detection.

As used herein, the term "2D inputs" can refer to 2D data types, such as 2D X-ray radiographs, 2D slices sampled from a 3D volume, and/or derived data that can be represented as a 2D array or image, such as the reconstruction loss in an autoencoder-based anomaly detector model (e.g., FIG. 13).

As used herein, the term "3D inputs" can refer to 3D data types that can be used to represent reconstruction or reconstruction-derived data for the purposes of training a machine learning model or as input for a model configured to generate predictions. Common example 3D inputs include voxels (e.g., occupancy grids), surface meshes (e.g., triangular, quadrilateral), volumetric (e.g., tetrahedral, hexahedral), point clouds, implicit functions, signed distance fields, and neural implicit fields.

As used herein, the term "anomalous data" can refer to data that is aberrant or otherwise different from a known distribution or expectation. Anomalous data can be an outlier in a distribution composed of samples of nominal data. For example, scan data of parts that do not meet a quality specification can be anomalous data.

As used herein, the term "nominal data" can refer to data that reflects an expected distribution. For example, scan data of parts that satisfy a quality requirement or specification can be nominal data.

As used herein, the term "anomaly detector" can refer to a model or ensemble of models that have been architected and trained in such a way as to detect deviations from an expected distribution of inputs.

As used herein, the term "attenuation" can generally refer to the loss of X-ray intensity as X-ray photons pass through matter. In 3D reconstruction data, "attenuation" or "attenuation value" can refer to the values of individual voxels in which higher magnitude can correspond with higher attenuation, and lower magnitude can correspond with lower attenuation. Attenuation values in 3D reconstructions can be a function of both the atomic composition of the scanned material and its physical density at a given temperature and pressure. For example, two polyurethane foams of identical chemical composition can result in different attenuation values in a reconstruction if they contain different volume fractions of gas dispersed in voids whose size is below the minimum spatial resolution of the X-ray CT scanner.

In 2D radiograph data, "attenuation" can refer to raw gray values that compose the 2D image. Lower magnitude values can correspond with lower attenuation and/or follow the Beer-Lambert law (i.e., relationship of light attenuation to material properties).

As used herein, the term "derived data" can refer to data that is calculated or generated from raw scan data. This can include 2D renderings or reconstruction data as well as quantitative metrics, such as pore size and shape, distributions of dimensional deviations, and specific 2D and 3D measurements, among others.

As used herein, the term "implicit functions" (including "neural implicit functions") can refer to a theoretically continuous function that represents a 3D shape. For example, implicit representations can be discretely sampled to determine whether a sample point is inside, upon, or outside a boundary. Implicit representations, such as signed distance fields, can also represent the positive or negative normal distance from a boundary. In this representation, the set of samples with the value of zero can represent the boundary, and can be commonly called a "level set."

As used herein, the term "meshes" can refer to either surface or volumetric meshes used for 3D shape representation.

As used herein, the term "multiview inputs" can refer to inputs to a multiview CNN, which can be a plurality of radiographs or 2D rendered views of a reconstruction.

As used herein, the term "occupancy grids" can refer to binary voxel data.

As used herein, the term "octrees" can refer to a 3D shape representation that uses a tree data structure in which each node has eight children nodes. Octrees can represent varying levels of detail recursively.

As used herein, the term "point clouds" can refer to a 3D shape representation in which a shape is represented by points in 3D space. Within point cloud representations, a 3D shape can be represented in various ways, including with points sampled upon a boundary according to a sampling strategy (e.g., Poisson disc sampling); with points upon and inside a boundary according to a sampling strategy; and/or with points upon and inside multiple boundaries in which points have a value denoting a label, class membership corresponding to material, or attenuation value of the corresponding boundary or region of voxels from which the points were sampled.

As used herein, the term "porosity location" can refer to the location in 3D space relative to a coordinate frame of reference of an individual pore in a 3D reconstruction.

As used herein, the term "porosity size" can refer to the dimensions and/or volume of a pore in a 3D reconstruction.

As used herein, the term "porosity shape" can refer to shape properties of individual pores, such as pore aspect ratio or pore sphericity.

As used herein, the term "porosity distance to surface" can refer to the minimal distance between an identified pore and the surface of an object that the identifier pore is within.

As used herein, the term "porosity sphericity" can refer to the degree to which a pore is or is not similar in shape to a sphere. For example, sphericity of 1 can denote a sphere, while values less than 1 can denote less spherical pores.

As used herein, the term "porosity count" can refer to the total number of instances of pores found within a datum. Porosity counts can be generated for all different types of CT data and derived data such as 2D radiographs, 3D reconstructions, slices of 3D reconstructions, etc.

As used herein, the term "reconstruction" can refer to a 3D voxel volume produced from 2D radiographs by a reconstruction algorithm (e.g., analytic and iterative algorithms) as well as 3D voxel volumes sampled from a reconstruction. The value of each voxel can represent the amount of X-ray attenuation measured at that location in space in the reconstruction.

As used herein, the term "rendering" can refer to a 2D image produced by a renderer, specifically, a program that translates 3D data into 2D images for display to a user and/or for input into another process.

As used herein, the term "radiograph" can refer to 2D X-ray images formed by recording the X-ray light that passes through an object and is detected by an X-ray imaging detector.

As used herein, the term "quadrilateral surface meshes" can refer to a 3D geometry representation in which a shape is represented by boundaries that are composed of four-sided faces, with each face having four vertices.

As used herein, the term "scan settings" can refer to CT scanner acquisition settings, including, but not limited to X-ray source energy, current, motion system coordinates, detector gain, exposure, and other settings, number of projections, and any user-defined scan objectives. CT scanner acquisition settings can differ for various items (e.g., multiple SKUs from a single manufacturer) or various instances of a single item (e.g., multiple parts of a single SKU from a single manufacturer).

As used herein, the term "spherical harmonics" can refer to a 3D shape descriptor composed of functions defined on the surface of a sphere that are Laplacian eigenfunctions (i.e., acoustical vibration modes).

As used herein, the term "supervised learning" can refer to a machine learning model that transforms an input-output pair received by the machine learning model into a mapping from the input to the output. For example, a plurality of radiographs can be input into the machine learning model, with each radiograph labeled with an output of "defect."

As used herein, the term "trained machine learning model" can refer to a set of computer data that has been configured to identify and recognize patterns in data using a training set, and can be applied to new data to identify similar patterns automatically.

As used herein, the term "triangular surface meshes" can refer to a 3D geometry representation in which a shape is represented by a boundary composed of three-sided faces, each face having three vertices.

As used herein, the term "unsupervised learning" can refer to a machine learning model which identifies patterns in inputs that do not include labels. For example, when using clustering, a machine learning model can identify, among a plurality of radiographs, a subset of radiographs with similar patterns, that can be related to a defect in each of the radiographs.

As used herein, the term "volumetric meshes" (e.g., tetrahedral) can refer to a 3D geometry representation in which a shape is represented by a 3D tessellation of poly-hedra. Polyhedra can include tetrahedrons, pyramids, trian-gular prisms, and hexahedrons.

As used herein, the term "voxel data" can refer to a 3D array of values, typically representing reconstruction data or reconstruction-derived data.

V. Examples

In this section, disclosed herein are a number of different methods for making a prediction (e.g., a global classifica-tion, segmentation or pixel/voxel-level classification, or likelihood) about input data using an AI model. Included are diagrams summarizing different input data sources, derived features, AI models, and specific tasks addressed.

Example A

Slice based classifications can be provided by training a model, such as CNN or random forest using 2D slices of 3D reconstructions as inputs. Random forest can be run with classical CV features or with learned convolutional features.

Figure 5:
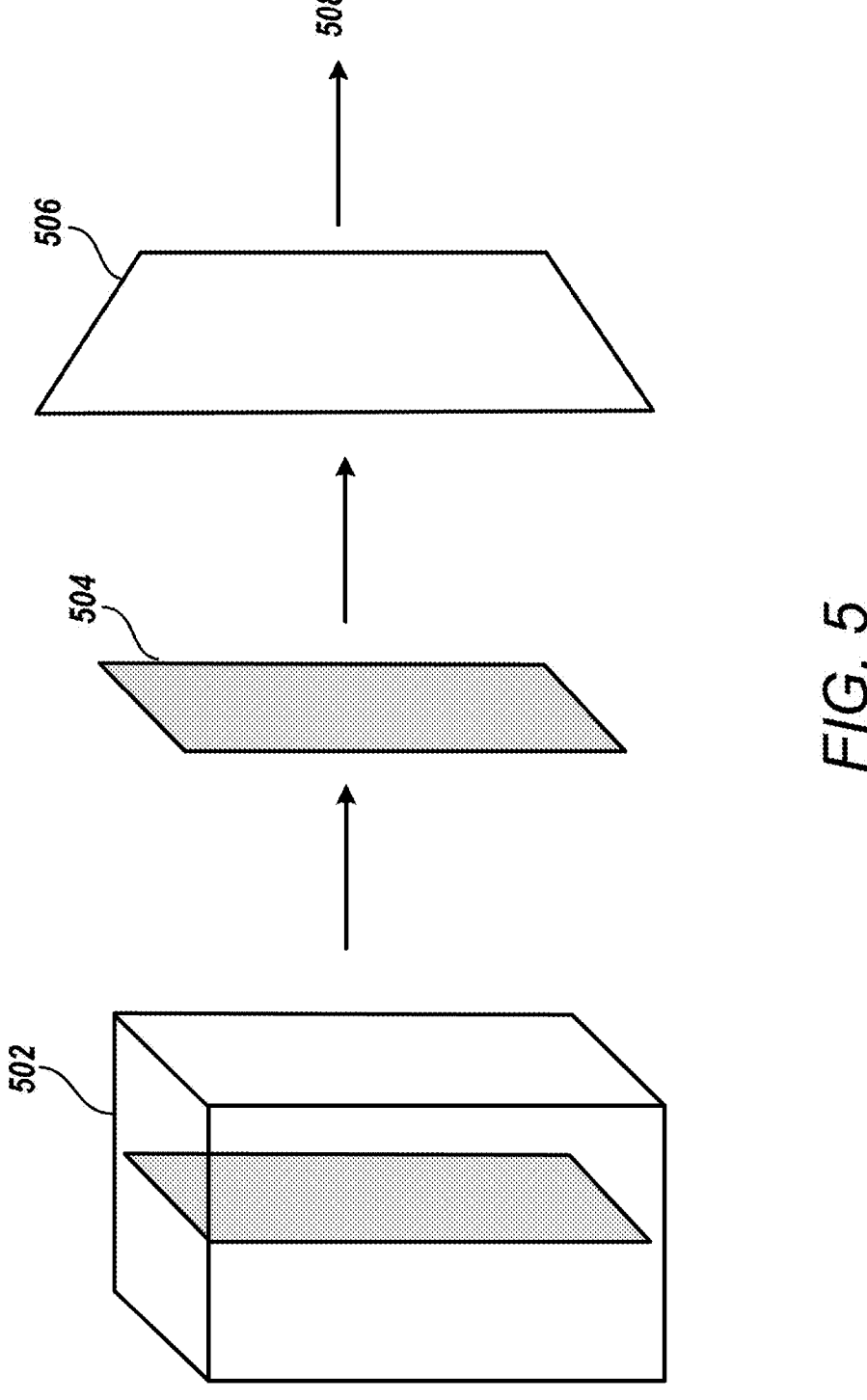
FIG. 5 illustrates a method of using 2D slices from a reconstruction to perform anomaly detection.
Figure 6:
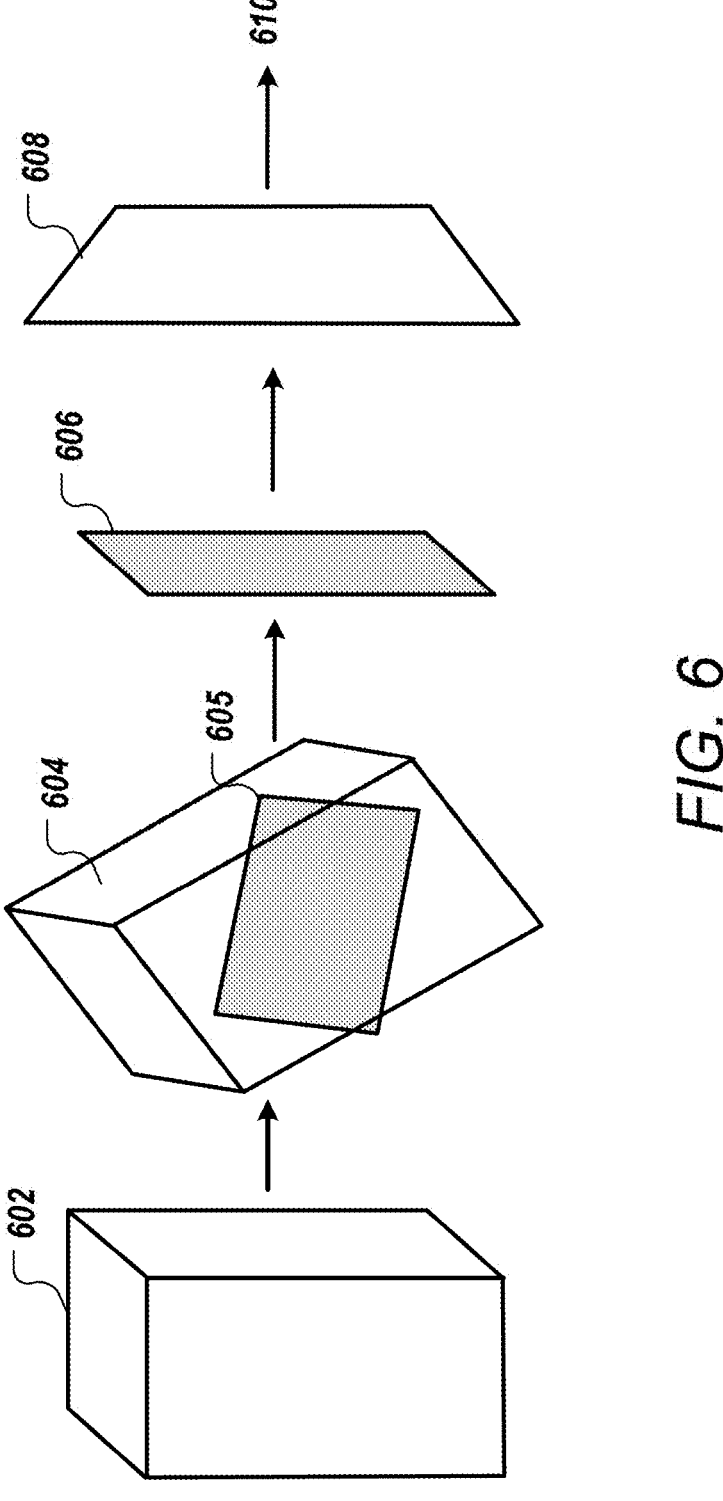
FIG. 6 illustrates a method of using reoriented reconstructions and slices of reconstructions to perform anomaly detection.
Figure 7:
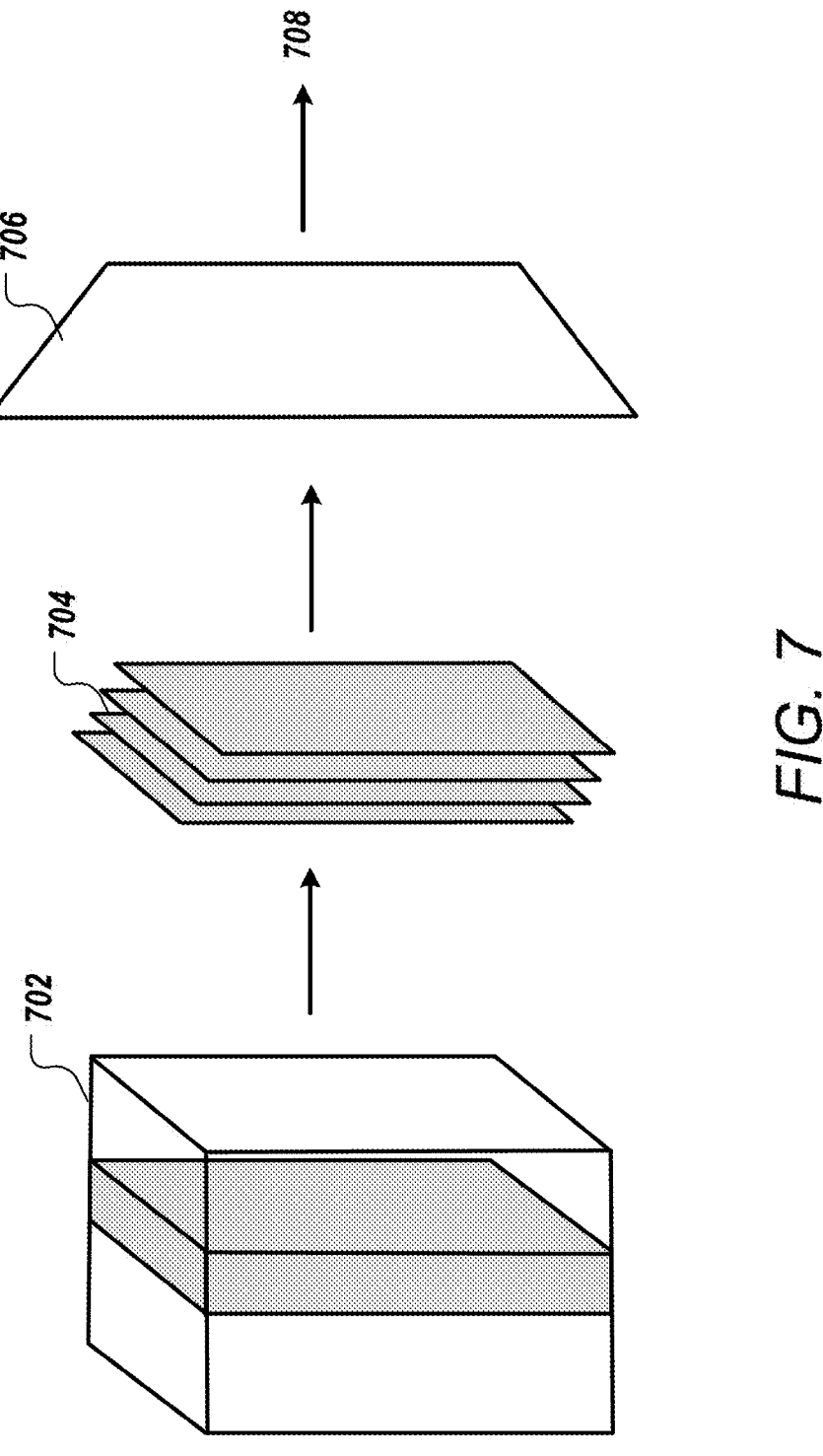
FIG. 7 illustrates a method of using groups of slices from a reconstruction to perform anomaly detection.

In slice-based methods, 2D "slices" of a 3D reconstructed volume can be reconstructed, as shown in FIGS. 5-7. Spe-cifically, in FIG. 5, a reconstruction 502 can be generated along a 3D sampling grid. A slice 504 (e.g., a 2D slice from the reconstruction 502) can be extracted from that grid and passed to a trained model 506 (e.g., an artificial intelligence model) configured to generate predictions 508. In FIG. 6, a reconstruction 602 can be generated along a 3D sampling grid, and can then be re-sampled along a new sampling grid based on a prescribed coordinate system or a coordinate system derived from features (e.g., geometric features 605) contained within the reconstruction. A 2D slice 606 can be extracted from the reoriented reconstruction 604. The result-ing slice 606 can then be passed to a trained model 608 (e.g., an artificial intelligence model) configured to generate pre-dictions 610. In FIG. 7, a reconstruction 702 can be gener-ated along a sampling grid, and a plurality of slices 704 (e.g., a group of slices) can be sampled along this sampling grid. These slices 704 can form a "slab" of reconstruction data that can then be passed to a trained model 706 (e.g., an artificial intelligence model) configured to generate predic-tions 708. The method described in FIG. 6 can be combined with the method described in FIG. 7 to sample a plurality of slices along a prescribed or derived coordinate system, producing a slab that can be passed to a trained model configured to generate predictions.

Example B

Figure 8:
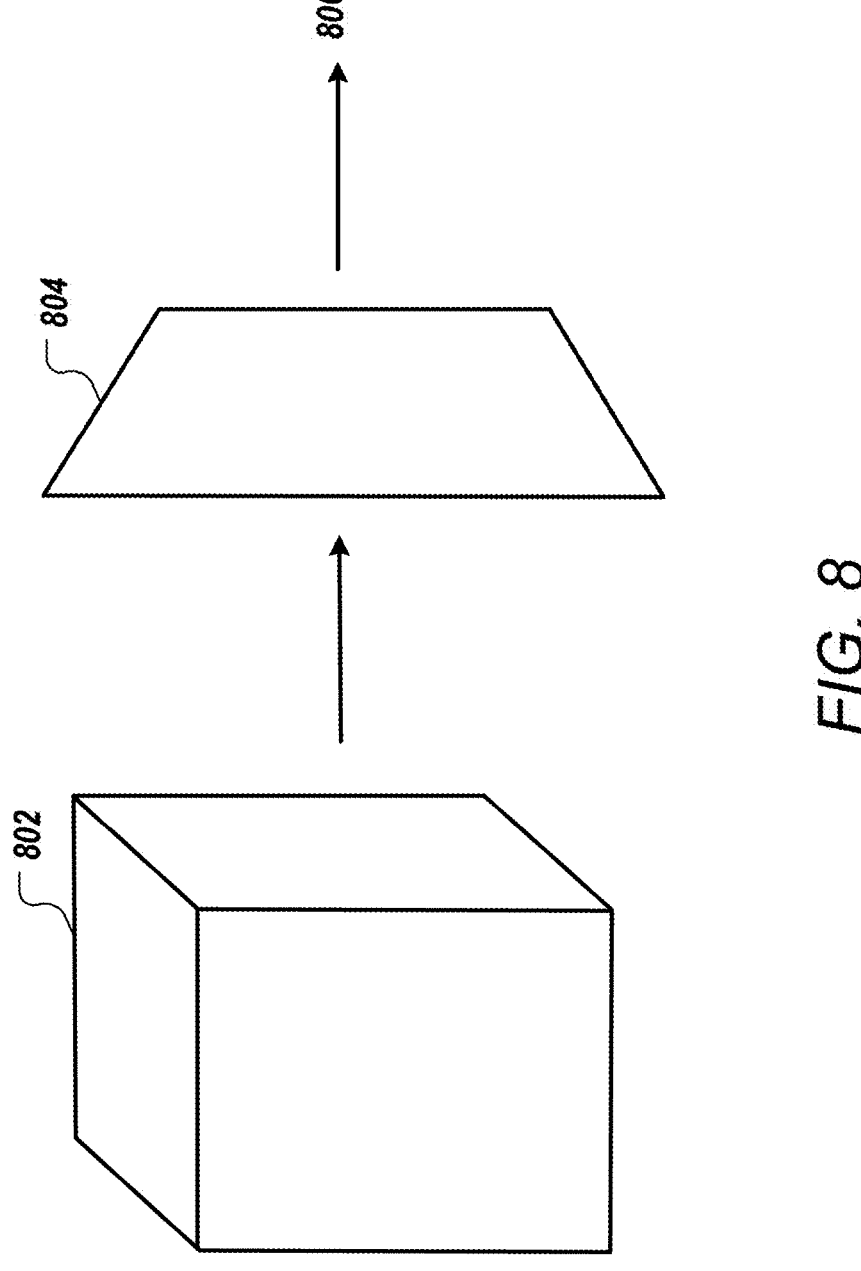
FIG. 8 illustrates a method of using a reconstruction to perform anomaly detection.

A model can be trained using direct voxel classifications. For example, FIG. 8 depicts a model 804 configured to generate predictions 806 directly upon a 3D voxel volume (e.g., a reconstruction 802). For example, the system can input the 3D voxel volume to a machine learning model and the 3D voxel volume reveals interior structure usable for anomaly detection. The system can receive an output from the machine learning model that indicates whether an anomaly has been detected for the 3D voxel volume.

Example C

A model can be trained using feature sets generated via different segmentation methods. Features can be generated by, for example, segmentation via threshold, random forest classification, or U-net.

In some embodiments, features can be generated by using different resulting geometry representations. For example, the geometry representations can include meshes, point clouds, harmonics, voxels, and implicits.

Example D

Figure 9:
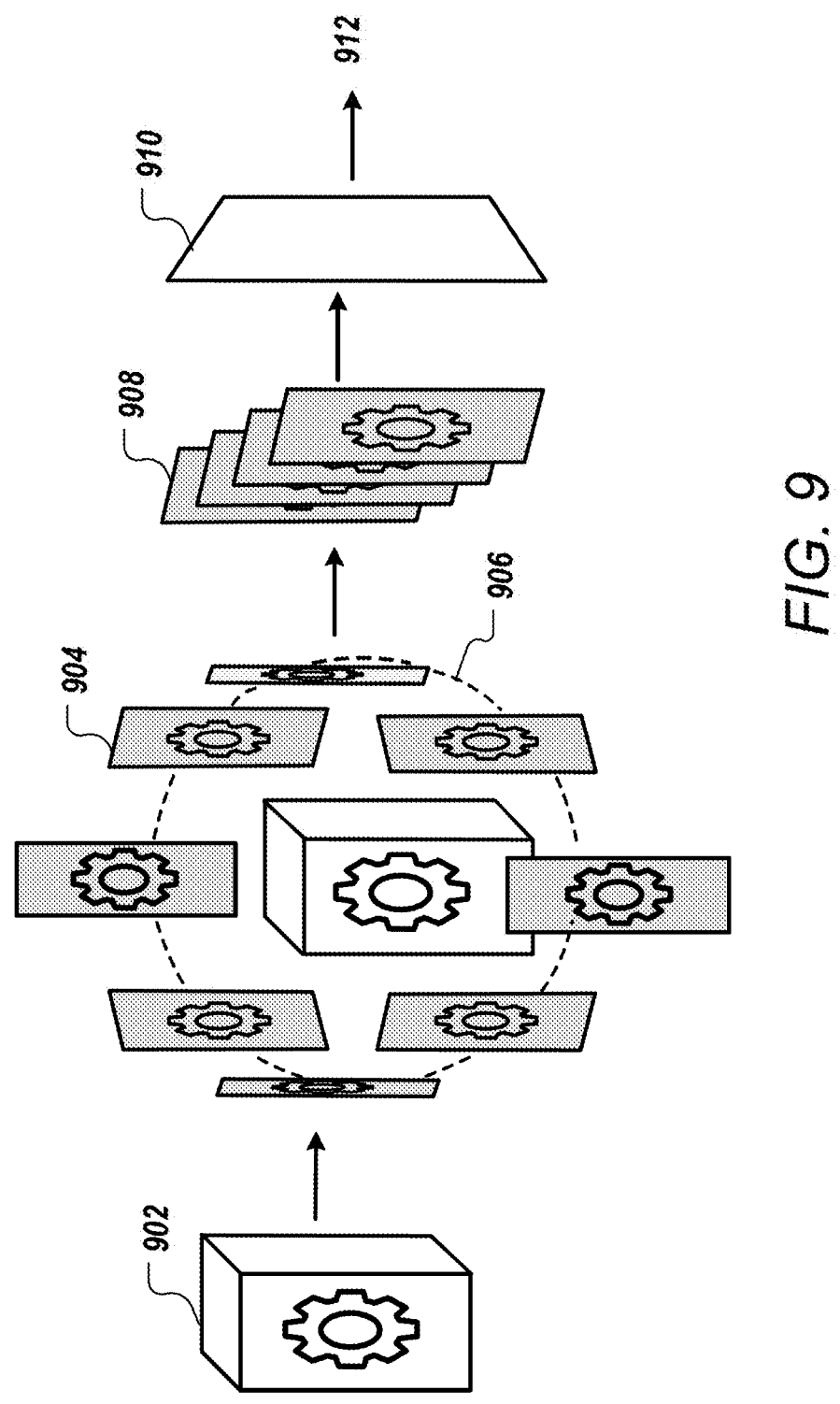
FIG. 9 illustrates a method of using views of reconstructions rendered from multiple vantage points to perform anomaly detection.
Figure 10:
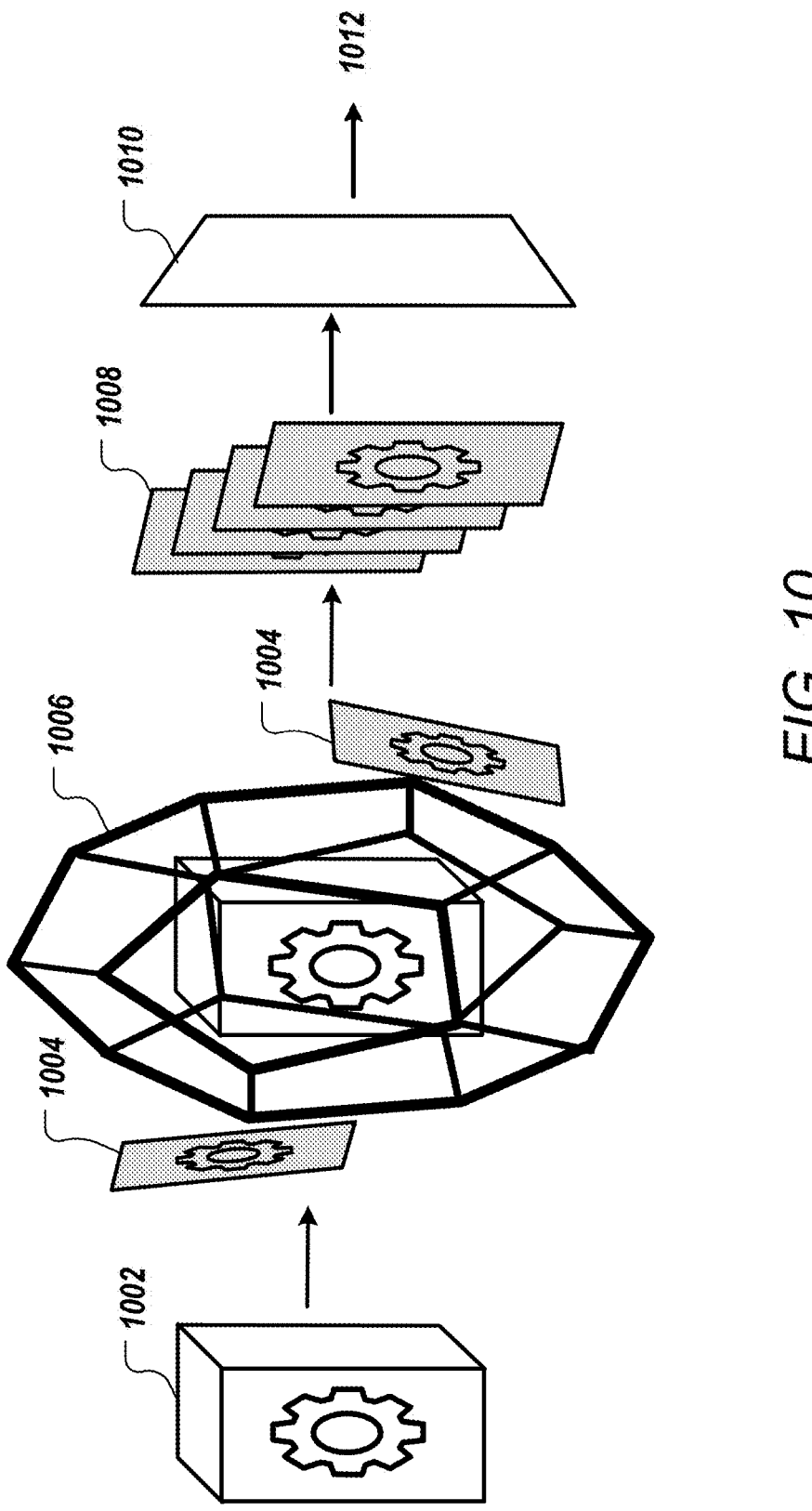
FIG. 10 illustrates a method of using 3D distributions of vantage points to perform anomaly detection.
Figure 11:
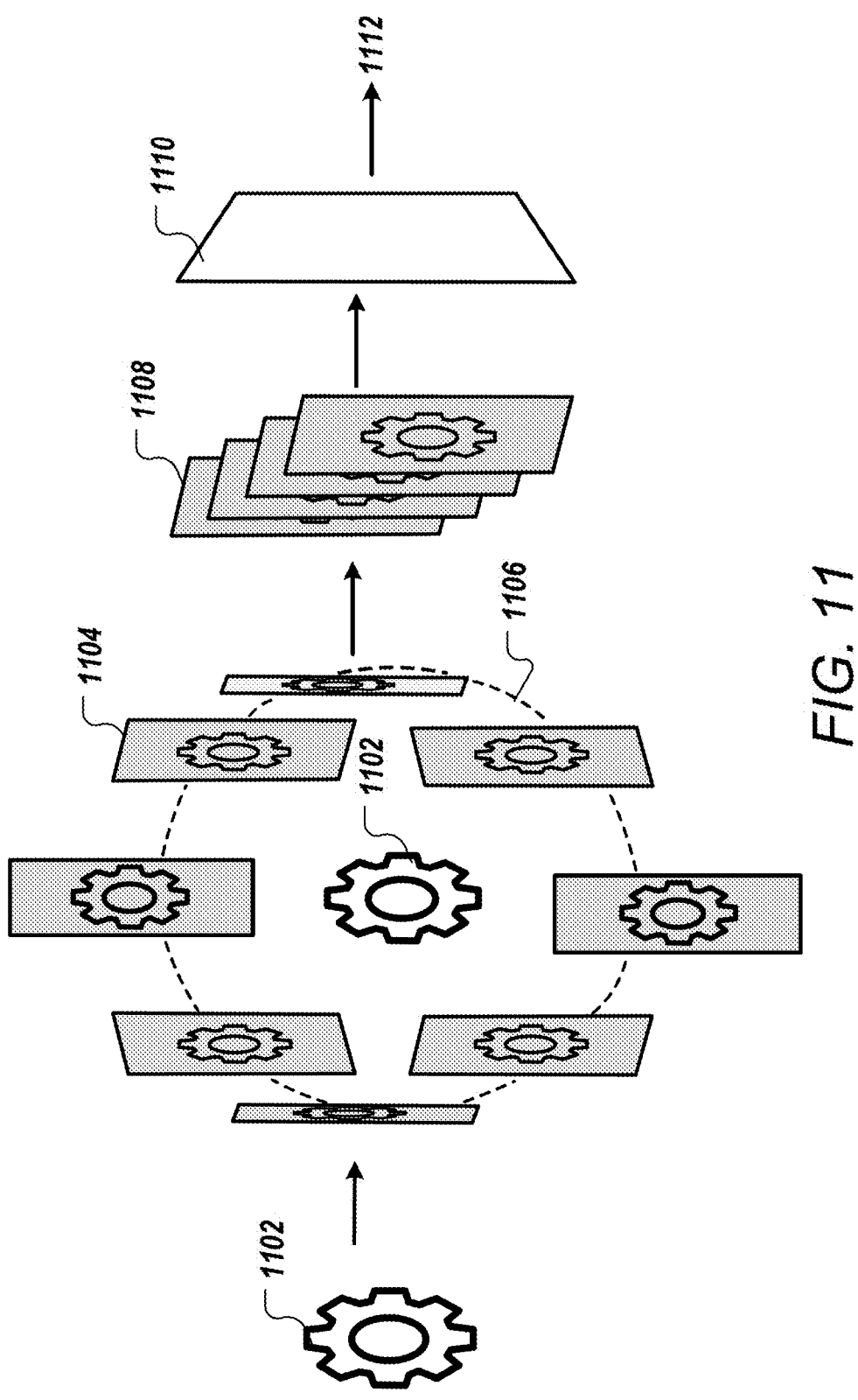
FIG. 11 illustrates a method of using 2D X-ray CT radiographs to perform anomaly detection.

A model can be trained using feature sets generated using multiview CNN with radiographs or rendered views, such as rendered views with specific rendering settings to accentuate material differences. In some implementations, the input to the model can include derived data from X-ray CT scan data and the derived data can include multiple views of a scan object. Each of the multiple views can be from a different location around the scan object. For example, FIG. 9 depicts multiple views 904 of a reconstruction 902 being rendered from multiple vantage points (e.g., multiple locations along a circular trajectory 906 that fully encircles the reconstruc-tion 902). These multiple views (e.g., the rendered views 908) can then be passed to a model (e.g., a neural network model 910) configured to generate predictions 912. FIG. 10 depicts multiple views 1004 of a reconstruction 1002 being rendered from multiple vantage points (e.g., multiple loca-tions specified by the vertices of a polyhedron 1006. For example, the 3D distribution of the vantage points is shown in FIG. 10, and each vantage point is at a vertex of the polyhedron 1006. These multiple views (e.g., the rendered views 1008) can then be passed to a model (e.g., a neural network model 1010) configured to generate predictions 1012. FIG. 11 depicts multiple 2D X-ray views 1104 (radio-graphs or projections) of an object being captured (e.g., an object being scanned 1102) from locations along a circular trajectory 1106 around the object 1102. These radiographs can be the same radiographs that are reconstructed to produce a 3D reconstruction. These multiple radiograph views (e.g., 2D X-ray projections 1108) can then be passed to a model (e.g., a neural network model 1110) to generate predictions 1112.

Example E

Figure 12:
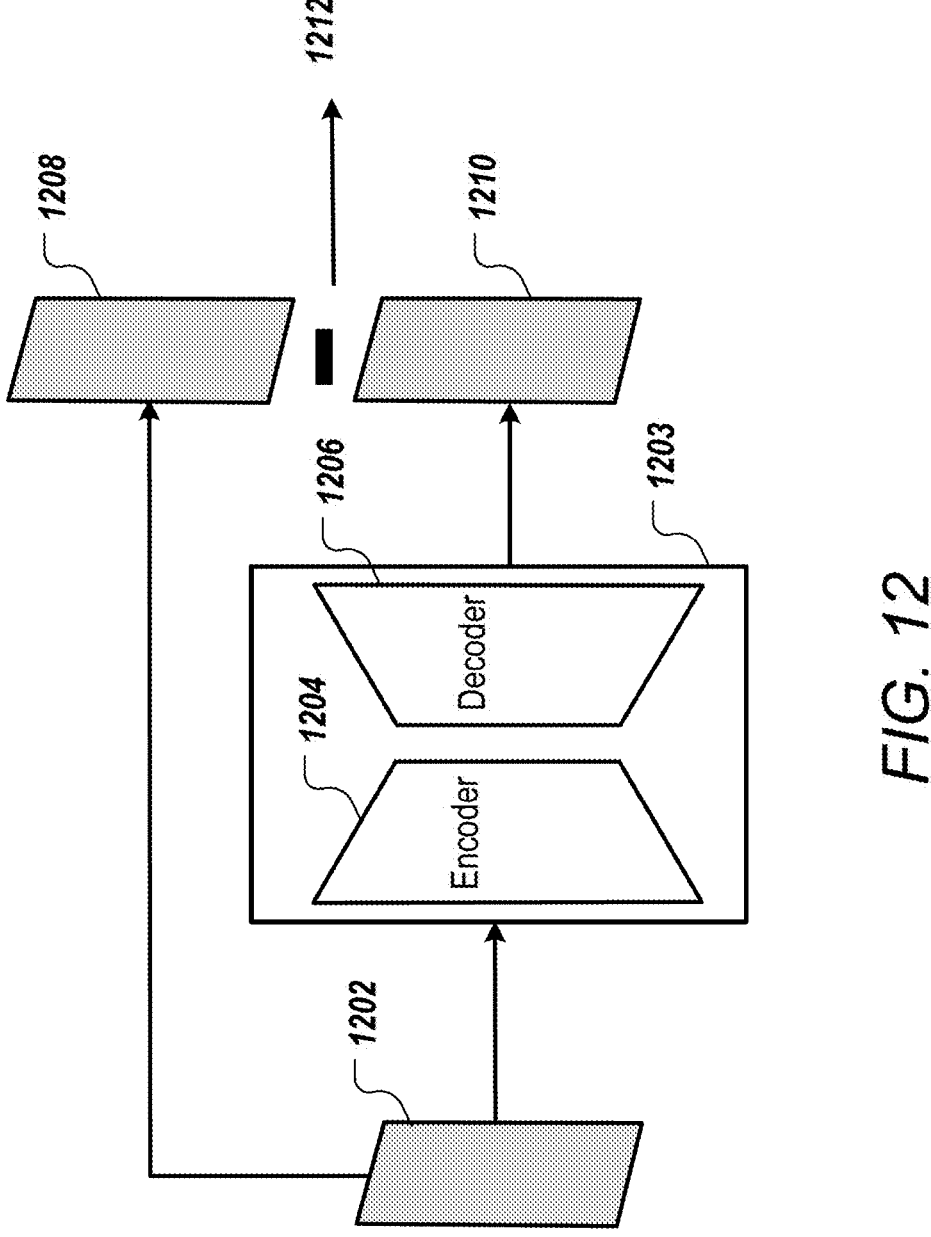
FIG. 12 depicts a method of using a trained autoencoder model to perform anomaly detection.

A model can be trained using unsupervised methods. A model can be trained using autoencoder-based anomaly detection. For example, FIG. 12 depicts an autoencoder model 1203 (e.g., an autoencoder that includes an encoder 1204 and a decoder 1206) trained to reconstruct a nominal distribution of data. When an anomalous sample 1202 (e.g., one or more 2D slices, one or more 2D X-ray projections, or 3D rendering of a reconstruction) is passed to the network (e.g., the autoencoder 1203) trained on non-anomalous distribution to generate predictions, the network's reconstruction loss 1212 can increase on samples that are not well-represented in the distribution on which it has been trained. The reconstruction loss 1212 can be a bitwise difference of the input 1208 (e.g., the anomalous sample 1202) and the autoencoder-reconstructed output 1210. FIG. 13 depicts using the reconstruction loss 1312 as manifested by a bit-wise difference between the input 1308 and the autoencoder-reconstructed output 1310 as a 2D input to a subsequent classifier (e.g., a neural network 1314) that makes a prediction 1316 about the sample based on this input 1302 (e.g., 2D slice, 2D X-ray projection, or 3D rendering of a reconstruction).

Figure 14:
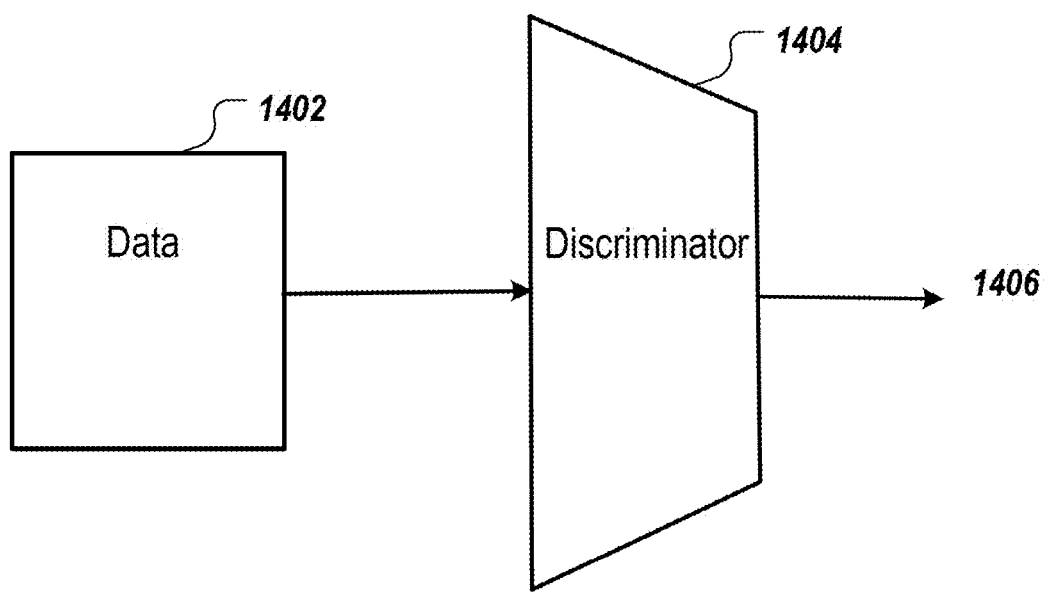
FIG. 14 depicts a method of using a discriminator component from a GAN to perform anomaly detection.

A model can be trained using generative adversarial network (GAN)-based anomaly detection. FIG. 14 depicts the discriminator component 1404 of a GAN that has been trained on nominal data (e.g., non-anomalous data) used for detection of anomalous samples. Derived data 1402 from a X-ray CT scan data (e.g., one or more 2D slices, one or more 2D X-ray projections, or a 3D rendering of a reconstruction) can be passed to the discriminator 1404 to generate predictions 1406.

A GAN can be trained on a distribution of known non-anomalous nominal samples such that the discriminator can no longer distinguish real samples from generated samples. The discriminator can then be used to predict whether a new sample is from the same distribution as the nominal distribution that the generator learned, producing a likelihood prediction that can be used to classify anomalous scans.

Example F

Figure 15:
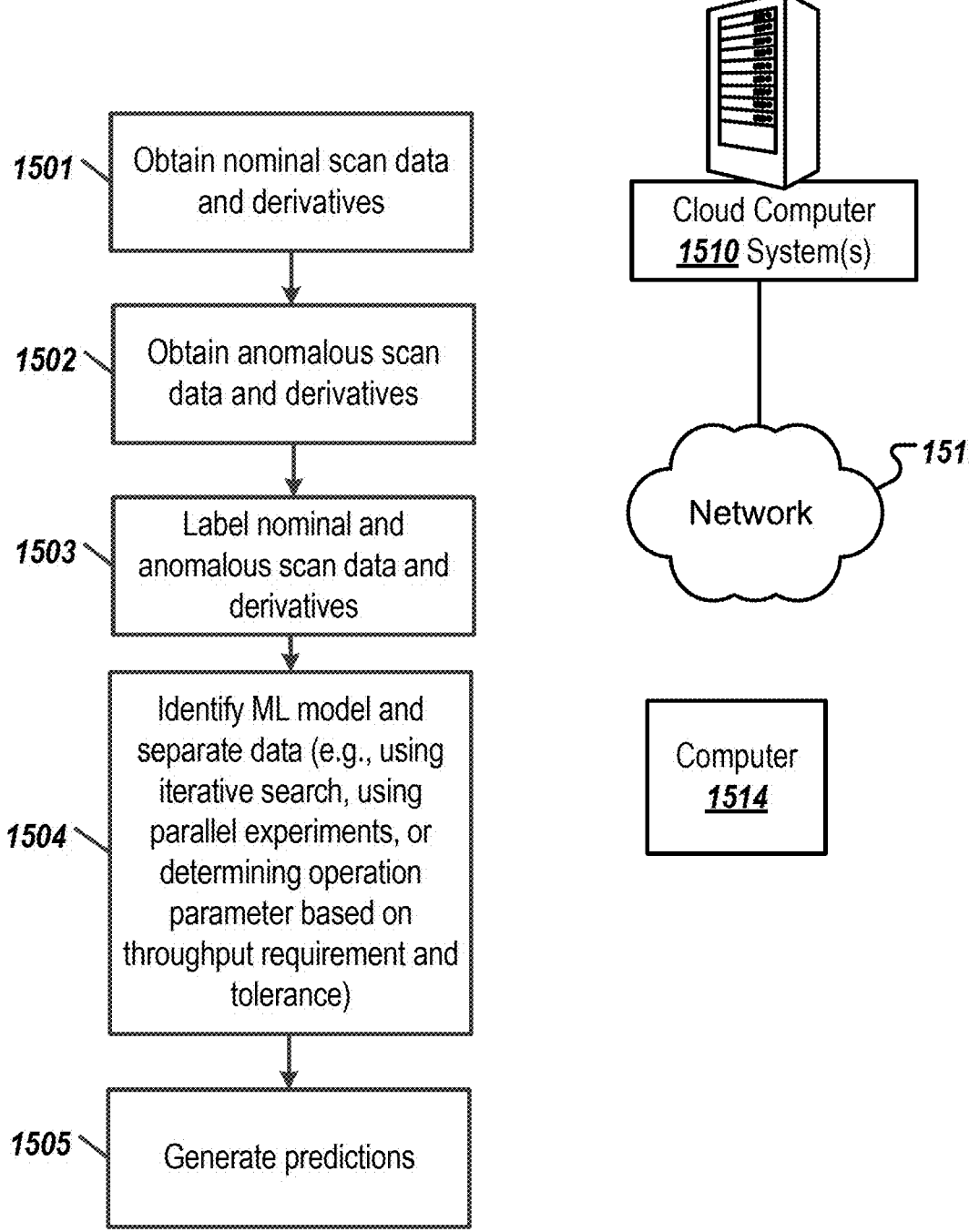
FIG. 15 illustrates an example of a flow diagram of a working example according to some example embodiments.

FIG. 15 illustrates a flowchart of a test that was actually performed and the achieved results. At 1501, a CT scanner was used to obtain scan data and its derivatives for 100 different samples of a single item family, e.g., a single SKU from a single manufacturer. The scan data and its derivatives included 2D radiographs, 3D reconstructions, and derivatives of 3D reconstructions, such as slice planes. The item family was a line of high-value goods from a particular manufacturer where all of the goods in the item family are visibly similar and are manufactured using similar methods, components, and processes.

At 1502, a CT scanner was used to obtain scan data and its derivatives for 5 different samples of known counterfeit items where the counterfeit items were produced by companies other than the manufacturer of the samples from the single item family samples. The counterfeit items appeared visibly similar to those items from the item the single item family samples. The scan data and its derivatives included 2D radiographs, 3D reconstructions, and derivatives of 3D reconstructions such as slice planes.

At 1503, the data obtained from the single item family samples was labeled as "nominal," while the data obtained from the counterfeit items was labeled as "anomalous." These labels were applied to all scan data for each set of items, including 2D radiographs, 3D reconstructions, and derivatives of 3D reconstructions such as slice planes. Hereafter, the data of the samples from the single item family will be referred to as the "nominal" data, and the data from the counterfeit items will be referred to as the "anomalous" data.

At 1504, experimentation was run to find a machine learning model which could best identify and separate the nominal data from the anomalous data.

The experimentation included experimentation amongst the input data for the model including: (a) training the model on only the 2D radiograph data, (b) training the model on only the 3D reconstruction data, (c) training the model on only the derivative slice plan data, and (d) training the model on a combination of (a), (b), and (c).

The experimentation included different model types and architectures including: (a) utilizing an anomaly detector, (b) utilizing a classifier, (c) utilizing a vision transformer component, (d) utilizing an autoencoder component, (d) utilizing a GAN component, (e) utilizing a CNN component, and (f) utilizing an ensemble of models where the ensemble of models included but was not limited to any of the individual model components previously mentioned (i.e., (a), (b), (c), (d), (e)).

For each experimentation amongst model architecture, each experimentation amongst input data was also run. For example, in separate experiments, an anomaly detector was trained using 2D radiograph data as input, using 3D reconstruction data as input, and using slice plane data as input.

For each experimentation amongst model architecture, further experimentation was done within the hyperparameter space for the model architecture. For example, in the experiment in which an anomaly detector was trained using 2D radiograph data, further experimentation was performed in order to find the optimal model hyperparameters.

For each experimentation amongst model architecture, further experimentation was performed in order to find the optimal set of data augmentation methodologies to be applied to the input data. Data augmentation methodologies included rotations, flips, crops, and other classical image manipulation techniques. Data augmentation also included various forms of noise generation, including Gaussian noise. Data augmentation also included other common data augmentation techniques. For example, in the experiment in which an anomaly detector trained using 2D radiograph data, further experimentation was performed to find the optimal set of hyperparameters in conjunction with data augmentation.

For each experimentation amongst model architecture, further experimentation was performed in order to find the minimum amount of input data needed. For example, in the experiment in which an anomaly detector was trained using 2D radiograph data, the model was trained using (a) only "nominal" images, (b) using a single "anomalous" image, and (c) using all of the available data. This experimentation was commercially useful as using less input data to train the model can lead to lower time and burden to realizing the full value of the commercial operation.

The experimentation was run in an automated fashion in order to decrease the total amount of time required to find the optimal outcome. This was done through parallelizing each possible experiment and launching a mix of brute force and iterative search methods to find a reasonable optimum among the experimentation space. For example, the system can perform iterative search for a hyperparameter of the machine learning model with a scoring function for accuracy, precision, recall, or any other suitable model performance metric. This automated, parallelized experimentation was run in a cloud environment, but could have been run in a local environment. The ability to parallelize in the automation was highly dependent on availability of machines with graphics processing units (GPUs), which is why a cloud environment in which machines with GPUs could be provisioned and de-provisioned in an automated fashion was chosen. In some implementations, the set of experiments can be performed in parallel in a cloud computer system 1510 that is connected to a network 1512. After a machine learning model is identified and trained, the trained machine learning model can be deployed to a computer 1514 that has no network connectivity. Thus, the trained machine learning model can detect anomalies for a scan object at the computer 1514 with no network connectivity.

The experiments were evaluated amongst a series of metrics to assess which was best suited for this particular commercial operation. The series of metrics included (a) model inference time, (b) a receiver operating characteristic (ROC) model, (c) an area under ROC curve (AUC) model, and (d) a model confusion matrix including true positive, false positive, true negative, and false negative information. The value of "best" for the commercial operation was selected based on the operation's throughput requirements and the operation's tolerance for incorrectly predicted items (i.e., either predicting a nominal item to be anomalous or predicting an anomalous item to be nominal). These values typically depend on the application. Hereafter, this model and its required input data, hyperparameters, data augmentation, input data set, and other associated metadata are known as the "optimal experiment." In some implementations, an operation parameter of a machine learning model can be determined based on a throughput requirement of a product handling process and a tolerance for incorrectly predicted objects of the product handling process. In some implementations, a training system for training the machine learning model can set a threshold on an output generated by the machine learning model based on the acceptability of false positives and/or false negatives after the machine learning model has been trained. For example, the training system can tune the threshold as a function of allowable false positives and/or false negatives. For example, the training system can tune the threshold to minimize false negatives, e.g., a product with defects that is mis-classified as a good product. The training system can adjust the threshold based on results of classifications on a sample set that contains known bad or anomalous parts until the desired false negative performance is achieved.

At 1505, the "optimal experiment" was subsequently used to generate predictions in the commercial operation. The prediction process included, for an item of unknown provenance (i.e., an item for which the commercial operation did not have prior knowledge as to its authenticity), (a) utilizing a CT scanner to obtain scan data and its derivatives, (b) selecting the scan data and/or derivative as determined for the optimal experiment, (c) inputting the input data to the trained model from the optimal experiment, and (d) using the output of the trained model to determine if the item is predicted to be nominal or anomalous. In this example, nominal equates to an item which is believed to be from the original "item family" from the original manufacturer, and anomalous equates to an item which is believed to be a counterfeit.

Figure 16:
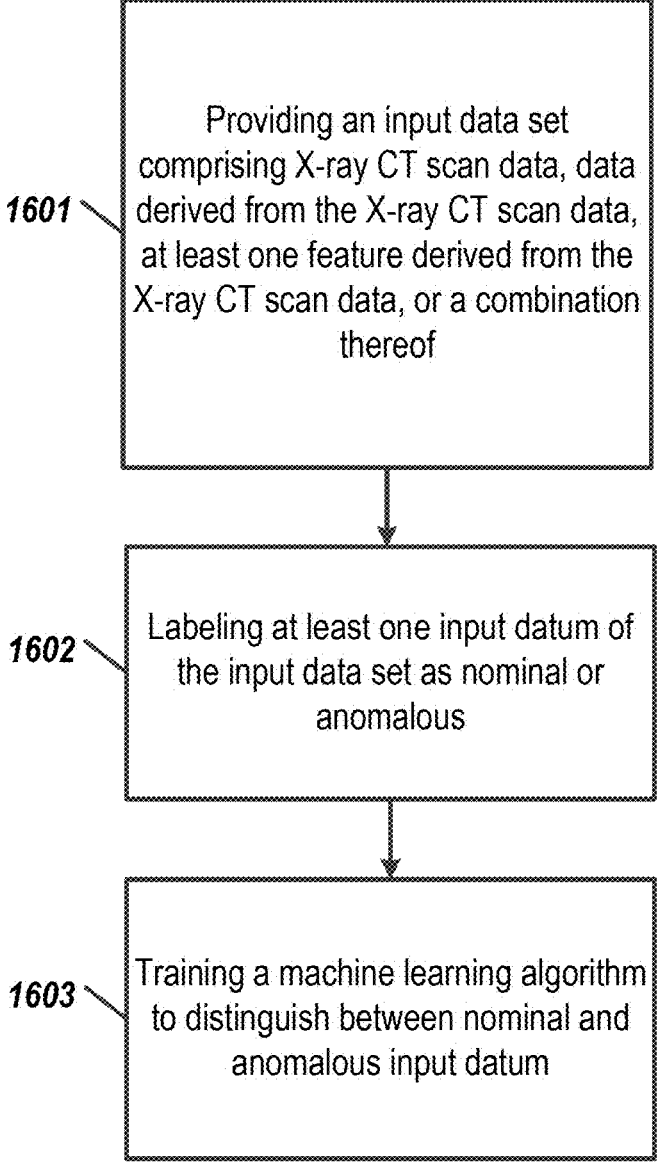
FIG. 16 illustrates an example of a flow diagram of a method according to various example embodiments.
Figure 18:
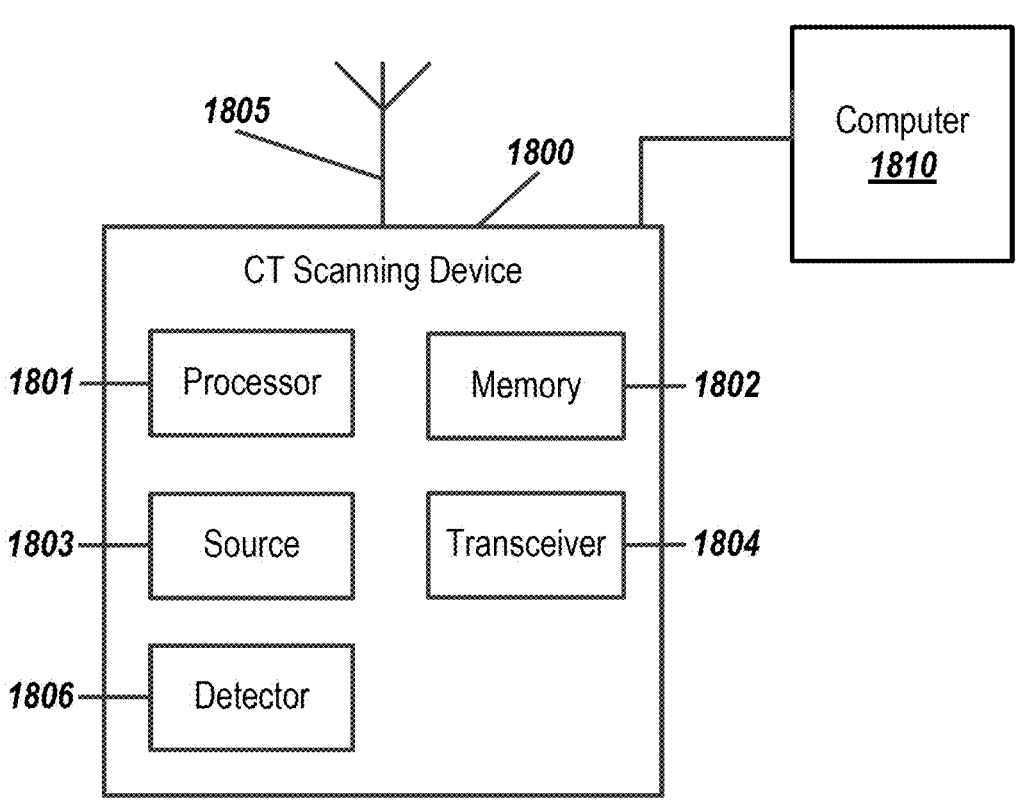
FIG. 18 illustrates an example of an X-ray imaging system according to some example embodiments.

FIG. 16 illustrates an example of a flow diagram of a method that can be performed by a scanning device, for example, CT scanning device 1800 illustrated in FIG. 18, according to various example embodiments, such as those described above with respect to FIGS. 5-15. In some example embodiments, the scanning device can be configured to perform CT scans by obtaining and combining a plurality of X-ray images (i.e., frames).

At 1601, the method can include providing an input data set comprising X-ray CT scan data, data derived from the X-ray CT scan data, at least one feature derived from the X-ray CT scan data, or a combination thereof.

In some example embodiments, the input data set can include at least one of at least one 2D radiograph, at least one 3D radiograph, at least one scan acquisition setting, associated metadata about the X-ray CT scan data, reconstruction data, 2D slices sampled from reconstructions, 3D reconstructions, rendering data, 2D renderings of reconstructions, point clouds, meshes, geometric representations sampled from reconstructions, triangular surface mesh, quadrilateral surface mesh, or a combination thereof. For example, the reconstruction data can be generated by rendering images using different attenuation values associated with different colors and opacity, or generated from different perspectives.

In various example embodiments, the data derived from the X-ray CT scan data can include at least one of 2D images of reconstruction, 2D renderings of reconstructions with no color mapping, or a combination thereof. Additionally or alternatively, the data derived from the X-ray CT scan data comprises at least one of 2D renderings of reconstructions with color mapping, point clouds, meshes, geometry representations sampled from reconstructions, 3D boundaries sampled at regularly spaced attenuation values, 3D boundaries sampled at specific attenuation values, histograms of 2D projection data, histograms of reconstruction data, 2D convolutional filter outputs, 3D convolutional filter outputs, quantitative one-dimensional (1D) metrics, 2D slices of 3D reconstructions, groups of 2D slices of reconstructions, 3D reconstructions, 3D data from 3D reconstructions, or a combination thereof. For example, the 2D slices of 3D reconstructions can be planar, helical, cylindrical, conical, spherical, or a T-spline/non-uniform rational B-spline surface. Furthermore, the 2D slices of 3D reconstructions can be aligned with a scan coordinate system; alternatively, the 2D slices of 3D reconstructions can be aligned with a non-scan coordinate system, wherein the scan coordinate system is sometimes defined by the scan acquisition geometry, i.e. the relationship between the source, the detector and the turntable components of the CT scanner In some example embodiments, the 3D data from 3D reconstructions can include at least one of boundary representations, 3D reconstructions, triangular surface meshes, quadrilateral surface meshes, volumetric meshes, point clouds, octrees, occupancy grids, implicit functions, spherical harmonics representation, or a combination thereof. For example, the volumetric meshes can include tetrahedral volumetric meshes. Furthermore, the implicit functions can include neural implicit functions.

In various example embodiments, the at least one feature derived from the X-ray CT scan data can include at least one of progressive thresholds, boundary representations of different specific materials, 3D convolutional filters, inclusions data, porosity data, wall thickness data, surface area data, surface flatness data, surface curvature data, surface roughness data, dimensions of features in 2D and 3D, dimensional deviations with respect to a computer-aided design model, dimensional deviations with respect to another CT scan, dimensional deviations on primitive-matched features in 2D and 3D, or a combination thereof. For example, the porosity data can include at least one of location, size, shape, distance to surface, sphericity, aspect ratio, orientation, region, or a combination thereof. Additionally or alternatively, wall thickness data can include at least one of distribution of wall thickness, region-specific thickness, or a combination thereof. Furthermore, the dimensional deviations on primitive-matched features in 2D and 3D can include relative positioning of geometric features including at least one of feature concentricity, alignment, spacing, or a combination thereof. Also, the inclusions data can include at least one of location, size shape, inclusion distance to surface, inclusions sphericity, or a combination thereof.

At 1602, the method can further include labeling at least one input datum of the input data set as nominal or anomalous. In various example embodiments, the labels can be applied on the entire image or on a subset of the image, wherein the subset is indicated by a primitive shape or complex polygon. In certain example embodiments, labels can be global, regional, or semantic (i.e., pixel-wise). In some example embodiments, the labels can be applied on the entire image or on a subset of the image, wherein the subset is indicated by a primitive shape or complex polygon. For example, the labels can indicate at least one of binary outcome of nominal or anomalous, continuous spectrum bounded by nominal and anomalous, class membership or probability of membership of pixels or voxels, indications of a type of anomaly, or a combination thereof. Furthermore, the labels indicating pixels can indicate semantic segmentation. In some example embodiments, the method can be a supervised method including labeling at least one input datum of the input data set as nominal or anomalous is used to train the machine learning model or algorithm. In various example embodiments, the method can be an unsupervised method, whereby no labels are provided to train the machine learning model or algorithm.

At 1603, the method can further include training a machine learning model or algorithm to distinguish between nominal and anomalous input datum. In some example embodiments, the machine learning model or algorithm can be trained on a remote on-demand server, on a network edge server, or a combination thereof.

FIG. 17 illustrates an example of a flow diagram of a method that can be performed, in part, by a computing device and/or scanning device, for example, CT scanning device 1800 illustrated in FIG. 18, according to various example embodiments, such as those described above with respect to FIGS. 5-15. In some example embodiments, the scanning device can be configured to perform CT scans by obtaining and combining a plurality of X-ray images (i.e., frames).

At 1701, the method can include inputting X-ray CT scan data, data derived from the X-ray CT scan data, at least one feature derived from the X-ray CT scan data, or a combination thereof, into a trained model. In some example embodiments, the trained model can be an anomaly detector and/or can be trained.

In various example embodiments, the trained model can be trained using at least one of an anomaly detector, a classifier, an ensemble of models, a vision transformer component, an autoencoder component, a generative adversarial network, a CNN, a data augmentation component, or a combination thereof. Additionally or alternatively, the trained model can be trained according to the method described in FIG. 16. In some example embodiments, the trained model can be trained using a machine learning model or algorithm selected from the group consisting of a CNN, autoencoder, GAN, vision transformer, and random forest. In some example embodiments, the trained model can be trained using 2D inputs, such as at least one of single view 2D inputs or multiview 2D inputs. Additionally or alternatively, the trained model can be trained using 3D inputs, such as at least one of voxel data, octree data, point clouds, meshes, implicit functions, harmonics inputs, or a combination thereof.

At 1702, the method can further include detecting at least one anomaly. As an example, anomaly detection can be performed on the cloud, on an edge device, on a mobile device, on a laptop, or on a desktop computer.

At 1703, the method can include performing at least one post-detection task after performing the detecting at 1702. For example, the method can include any of: using the detection of the anomaly to make an inline decision; populating a user interface with results; assigning a OK/NG label to a UUID corresponding to the specific part; changing the status indicator UI the scanner; highlighting a defect or anomalous region in 2D or 3D in a user interface; generating a decision about the scanned object; logging metadata; detecting counterfeit goods, authenticating goods, or a combination thereof; detecting counterfeit artwork, authenticating artwork, or a combination thereof; creating a digital record for one-of-a-kind goods; detecting production machine and tool wear and tear; detecting machine calibration changes; detecting changes in supply chains; detecting drift in product quality over time; maintaining historical records of items produced and their quality at manufacturing time; detecting variance in production lines running the same product; detecting the root cause of where a production defect occurred in a manufacturing process; quantifying yield and production metrics for users; or a combination thereof. As an example, the inline decision can be based upon at least one of authentication, anomaly detection, supplier part detection, or a combination thereof. For example, the system can highlight a defect or an anomalous region 1706 in 2D or 3D in the user interface 1704 on the display device 1708. As another example, the method can include detecting a change based on at least one anomaly having been detected for a scan object, and the detected change can be one or more of the changes 1710. In some implementations, the method can include processing the at least one anomaly using a classifier to determine an anomaly type from a predetermined number of anomaly types for the at least one anomaly. For example, the system can include a classifier downstream of the anomaly detector to classify the anomaly as one of a fixed number of anomaly types.

FIG. 18 illustrates an example of CT scanning device 1800, which can be configured to perform CT imaging. CT scanning device 1800 can include one or more of a mobile device, such as a mobile phone, smart phone, personal digital assistant (PDA), tablet, or portable media player; desktop computer; laptop computer; or any combination thereof.

CT scanning device 1800 can include at least one processor, indicated as 1801. Processor 1801 can be embodied by any computational or data processing device, such as a central processing unit (CPU), application specific integrated circuit (ASIC), or comparable device. The processors can be implemented as a single controller, or a plurality of controllers or processors.

CT scanning device 1800 can include at least one memory, indicated as 1802. The memory can be fixed or removable. The memory can include computer program instructions or computer code contained therein. Memory 1802 can independently be any suitable storage device, such as a non-transitory computer-readable medium. The term "non-transitory," as used herein, can correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory can be used. The memories can be combined on a single integrated circuit as the processor, or can be separate from the one or more processors. Furthermore, the computer program instructions stored in the memory, and which can be processed by the processors, can be any suitable form of computer program code, for example, a compiled or interpreted computer program written in any suitable programming language.

Processor 1801, memory 1802, and any subset thereof, can be configured to provide means corresponding to the various blocks of FIGS. 5-17. In some implementations, a computer 1810 directly attached to the CT scanning device 1800 can be configured to provide means corresponding to the various blocks of FIGS. 5-17. Although not shown, the devices can also include positioning hardware, such as GPS or micro electrical mechanical system (MEMS) hardware, which can be used to determine a location of the device. Other sensors are also permitted, and can be configured to determine location, elevation, velocity, orientation, and so forth, such as barometers, compasses, and the like. In some implementations, a machine learning model can generate an output that indicates that the at least one anomaly has been detected for a scan object at a computer (e.g., the computer 1810) directly attached to or a part of a CT scanner (e.g., the CT scanning device 1800) that generates the CT scan data for the scan object, and the computer has no network connectivity. For example, the computer 1810 that implements the machine learning model can have no network connectivity.

CT scanning device 1800 can include at least one X-Ray source, indicated as 1803, that can be configured to emit X-rays. In certain example embodiments, X-ray source 1803 can be at least one of a sealed tube-based X-ray source, an open tube-based X-ray source, a cold-cathode X-ray source, a rotating anode X-ray source, a stationary anode X-ray source, a liquid metal anode X-ray source, and tribolumi-nescent X-ray source.

As shown in FIG. 18, transceiver 1804 can be provided, and one or more devices can also include at least one antenna, illustrated as 1805. CT scanning device 1800 can have many antennas, such as an array of antennas configured for multiple input multiple output (MIMO) communications, or multiple antennas for multiple RATs. Other configurations of these devices, for example, can be provided. Transceiver 1804 can be a transmitter, a receiver, both a transmitter and a receiver, or a unit or device that can be configured both for transmission and reception.

The memory and the computer program instructions can be configured, with the processor for the particular device, to cause a hardware apparatus to perform any of the processes described above (i.e., FIGS. 5-17). Therefore, in certain example embodiments, a non-transitory computer-readable medium can be encoded with computer instructions that, when executed in hardware, perform a process such as one of the processes described herein. Alternatively, certain example embodiments can be performed entirely in hardware.

CT scanning device 1800 can further include detector 1806 configured to detect at least one x-ray signal and/or fluorescence signal (i.e., visible light). In some example embodiments, detector 1806 can include any combination of a complementary metal-oxide-semiconductor (CMOS) digital camera sensor, a red-green-green-blue (RGGB) Bayer filter, an optical camera, a monochromatic optical camera, 1D line array detector, a back-side-illuminated sensor, a front-side-illuminated sensor, a charge-coupled device (CCD) detector, a photodiode, an X-ray flat panel detector, a linear array X-ray detector. In certain example embodiments, detector 1806 can be configured to detect fluorescence signals. In various example embodiments, detector 1806 can be aimed directly at a scintillator.

The processors and memories can be configured to provide means corresponding to the various blocks of FIGS. 5-17. Although not shown, the devices can also include positioning hardware, such as GPS or micro electrical mechanical system (MEMS) hardware, which can be used to determine a location of the device. Other sensors are also permitted, and can be configured to determine location, elevation, velocity, orientation, and so forth, such as barometers, compasses, and the like.

In certain example embodiments, an apparatus can include circuitry configured to perform any of the processes or functions illustrated in FIGS. 5-17. As used in this application, the term "circuitry" can refer to one or more or all of the following: (a) hardware-only circuit implementations (such as implementations in only analog and/or digital circuitry), (b) a combination of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In some example embodiments, CT scanning device 1800 can include means for performing a method, a process, or any of the variants discussed herein. Examples of the means can include one or more processors, memory, controllers, transmitters, receivers, and/or computer program code for causing the performance of the operations.

In various example embodiments, CT scanning device 1800 can be controlled by memory and a processor to execute the methods described herein.

Certain example embodiments can be directed to an apparatus that includes means for performing any of the methods described herein.

The features, structures, or characteristics of example embodiments described throughout this specification can be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment can be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics can be combined in any suitable manner in one or more example embodiments.

Additionally, if desired, the different functions or procedures discussed above can be performed in a different order and/or concurrently with each other. Furthermore, if desired, one or more of the described functions or procedures can be optional or can be combined. As such, the description above should be considered as illustrative of the principles and teachings of certain example embodiments, and not in limitation thereof.

It will be readily understood that the components of certain example embodiments, as generally described and illustrated in the figures herein, can be arranged and designed in a wide variety of different configurations. Thus, the above detailed description of some example embodiments of systems, methods, apparatuses, and computer program products for nonintrusive scanning of objects using X-ray electromagnetic radiation is not intended to limit the scope of certain example embodiments, but is instead representative of selected example embodiments.

One having ordinary skill in the art will readily understand that the example embodiments discussed above can be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

Examples

Although the present application is defined in the attached claims, it should be understood that the present invention can also (additionally or alternatively) be defined in accordance with the following examples:

Example 1: A method for training a machine learning model, comprising:

providing an input data set comprising X-ray computed tomography (CT) scan data, data derived from the X-ray CT scan data, at least one feature derived from the X-ray CT scan data, or a combination thereof; and training a machine learning model to distinguish between nominal and anomalous input datum.

Example 2: The method of Example 1, wherein a supervised method including labeling at least one input datum of the input data set as nominal or anomalous is used to train the machine learning model.

Example 3: The method of any of Examples 1 and 2, wherein an unsupervised method whereby no labels are provided to train the machine learning model.

Example 4: The method of any of Examples 1-3, wherein the machine learning model is trained on a remote on-demand server, on a network edge server, or a combination thereof.

Example 5: The method of any of Examples 1-4, wherein the input data set comprises at least one of: at least one 2D radiograph; at least one 2D slice of 3D reconstructions; at least one 2D slice sampled from reconstructions; at least one group of 2D slices of reconstructions; at least one 2D rendering of reconstructions with color mapping; at least one 3D reconstruction; 3D data from 3D reconstructions; at least one scan acquisition setting; associated metadata about the X-ray CT scan data; reconstruction data; rendering data; at least one geometric representation sampled from reconstructions comprising any of triangular surface meshes, quadrilateral surface meshes, point clouds, implicit surfaces, octrees, occupancy grids, or a combination thereof; at least one 3D boundary sampled at regularly spaced or specific attenuation values; at least one histogram of 2D projection data; at least one histogram of reconstruction data; at least one 2D convolutional filter output; at least one 3D convolutional filter output; at least one quantitative one-dimensional metric; or a combination thereof.

Example 6: The method of Example 4, wherein the reconstruction data is generated by rendering images using different attenuation values associated with different colors and opacity, or generated from different perspectives.

Example 7: The method of any of any of Examples 1-6, wherein the data derived from the X-ray CT scan data comprises at least one of 2D images of reconstruction, 2D renderings of reconstructions with no color mapping, or a combination thereof.

Example 8: The method of Example 5, wherein the 2D slices of 3D reconstructions are planar, helical, cylindrical, conical, spherical, or a T-spline/non-uniform rational B-spline surface.

Example 9: The method of any of Examples 1-8, wherein the 2D slices of 3D reconstructions are aligned with a scan coordinate system.

Example 10: The method of any of Examples 1-9, wherein the 2D slices of 3D reconstructions are aligned with a non-scan coordinate system.

Example 11: The method of any of Examples 1-10, wherein the 3D data from 3D reconstructions comprise at least one of triangular surface meshes, quadrilateral surface meshes, volumetric meshes, point clouds, octrees, occupancy grids, implicit functions, spherical harmonics representation, or a combination thereof.

Example 12: The method of Example 11, wherein the volumetric meshes comprise tetrahedral, pyramidal, and hexahedral volumetric meshes.

Example 13: The method of any of Examples 1-12, wherein the implicit functions comprise neural implicit functions.

Example 14: The method of any of Examples 1-13, wherein the at least one feature derived from the X-ray CT scan data comprises at least one of progressive thresholds, boundary representations of different specific materials, 3D convolutional filters, inclusions data, porosity data, wall thickness data, surface area data, surface flatness data, surface curvature data, surface roughness data, dimensions of features in 2D and 3D, dimensional deviations with respect to a computer-aided design model, dimensional deviations with respect to another CT scan, dimensional deviations on primitive-matched features in 2D and 3D, or a combination thereof.

Example 15: The method of Example 14, wherein the porosity data comprises at least one of location, size, shape, distance to surface, sphericity, region, aspect ratio, orientation, count, or a combination thereof.

Example 16: The method of any of Examples 1-15, wherein the wall thickness data comprises at least one of distribution of wall thickness, region-specific thickness, or a combination thereof.

Example 17: The method of any of Examples 1-16, wherein the dimensional deviations on primitive-matched features in 2D and 3D comprise relative positioning of geometric features comprising at least one of feature such as concentricity, alignment, spacing, or a combination thereof.

Example 18: The method of any of Examples 1-17, wherein the inclusions data comprises at least one of location, size shape, at least one of location, size shape, inclusions distance to surface, inclusions sphericity, aspect ratio, orientation, aspect ratio, orientation, or a combination thereof.

Example 19: The method of any of Examples 1-19, wherein the labels indicate at least one of binary outcome of nominal or anomalous, a continuous spectrum bounded by nominal and anomalous, indications of a type of anomaly, or a combination thereof.

Example 20: The method of any of Examples 1-20, wherein the labels are applied on the entire image or on a subset of the image, wherein the subset is indicated by a primitive shape or complex polygon.

Example 21: The method of any of Examples 1-21, wherein the labels comprise any of global labels, regional labels, semantic labels, pixel-wise labels, or a combination thereof.

Similar operations and processes as described in Examples 1 to 21 can be performed in a system comprising: at least one processor; and at least one memory storing instructions that, when executed by the at least one processor, cause the apparatus at least to perform the operations and processes.

Further, a non-transitory computer readable medium comprising program instructions for training a machine learning model that, when executed by an apparatus, cause the apparatus to perform operations as described in any of the Examples 1 to 21 can also be implemented.

Example 22: A method for anomaly detection, comprising:

inputting X-ray CT scan data, data derived from the X-ray CT scan data, at least one feature derived from the X-ray CT scan data, or a combination thereof, into a trained machine learning model; and detecting at least one anomaly.

Example 23: The method of Example 22, further comprising at least one of:

using the detection of the anomaly to make an inline decision;

populating a user interface with results;

assigning a OK/NG label to a universal unique identifier corresponding to a specific part;

changing a status indicator user interface on a scanner;

highlighting a defect or anomalous region in 2D or 3D in the user interface;

generating a decision about a scanned object;

logging metadata;

detecting counterfeit goods, authenticating goods, or a combination thereof;

detecting counterfeit artwork, authenticating artwork, or a combination thereof;

creating a digital record for one-of-a-kind goods;

detecting production machine and tool wear and tear;

detecting machine calibration changes;

detecting changes in supply chains;

detecting drift in product quality over time;

maintaining historical records of items produced and their quality at manufacturing time;

detecting variance in production lines running the same product;

detecting the root cause of where a production defect occurred in a manufacturing process;

quantifying yield and production metrics for users; or a combination thereof.

Example 24: The method of Example 23, wherein the inline decision comprises an authentication, anomaly detection, supplier part detection, quality control, quality analysis, or a combination thereof task.

Example 25: The method of any of Examples 22-24, wherein the trained machine learning model comprises at least one of an anomaly detector, a classifier, an ensemble of models, a vision transformer component, an autoencoder component, a generative adversarial network, a convolutional neural network, a data augmentation component, or a combination thereof.

Example 26: The method of any of Examples 22-25, wherein the trained machine learning model is trained according to the method of claim 1.

Example 27: The method of any of Examples 22-26, wherein the trained machine learning model is trained using a machine learning model selected from the group consisting of a convolutional neural network, autoencoder, generative adversarial network, vision transformer, and random forest.

Example 28: The method of any of Examples 22-27, wherein the trained machine learning model is stored on a remote on-demand server, a network edge server, a browser, or the CT scanner.

Example 29: The method of any of Examples 22-28, wherein the trained machine learning model is trained using two-dimensional (2D) inputs.

Example 30: The method of Example 29, wherein the 2D inputs comprise at least one of single view 2D inputs or multiview 2D inputs.

Example 31: The method of any of Examples 22-30, wherein the trained machine learning model is trained using three-dimensional (3D) inputs.

Example 32: The method of Example 31, wherein the 3D inputs comprise at least one of voxel data, octree data, point clouds, meshes, implicit functions, harmonics inputs, or a combination thereof.

Example 33: The method of any of Examples 22-32, wherein detecting the anomaly is performed on a cloud, on an edge device, on a mobile device, on a laptop, on a desktop computer, or on the CT scanner.

Similar operations and processes as described in Examples 22 to 33 can be performed in a system comprising: at least one processor; and at least one memory storing instructions that, when executed by the at least one processor, cause the apparatus at least to perform the operations and processes.

Further, a non-transitory computer readable medium comprising program instructions for anomaly detection that, when executed by an apparatus, cause the apparatus to perform operations as described in any of the Examples 22 to 33 can also be implemented.

Example 34: A method for anomaly detection, comprising:

obtaining X-ray computed tomography (CT) scan data for a scan object of a predetermined object type;

producing derived data from the X-ray CT scan data, wherein the derived data reveals at least one interior structure usable for anomaly detection in objects of the predetermined object type;

inputting at least the derived data into a machine learning model, which has been trained using at least derived data produced from prior X-ray CT scan data for objects of the predetermined object type;

receiving an output from the machine learning model that indicates that at least one anomaly has been detected for the scan object; and providing an output to a physical device based on the at least one anomaly having been detected for the scan object.

Example 35: The method of Example 34, wherein the producing comprises generating a shape representation of the X-ray CT scan data using a segmentation method that is based on a structural property of the X-ray CT scan data, wherein the shape representation represents information about material properties of the scan object.

Example 36: The method of any of Examples 34 and 35, wherein the producing comprises producing the derived data from three-dimensional (3D) reconstruction data that provides dimensionally accurate spatial and material information about both an inside and an outside of the scan object.

Example 37: The method of claim of any of Examples 34-36, wherein the derived data comprises multiple views of the scan object, and each of the multiple views is from a different location around the scan object.

Example 38: The method of Example 37, wherein the X-ray CT scan data comprises three-dimensional (3D) reconstruction data for the scan object, and the multiple views are rendered views of the 3D reconstruction data produced using a rendering setting that accentuates material differences.

Example 39: The method of Example 37, wherein each different location around the scan object is specified by a vertex of a polyhedron.

Example 40: The method of Example 37, wherein the multiple views comprise multiple two-dimensional (2D) radiographs for the scan object.

Example 41: The method of any of Examples 34-40, wherein the derived data comprises porosity data of one or more pores detected in the X-ray CT scan data.

Example 42: The method of Example 41, wherein the porosity data comprises porosity location, porosity size, porosity shape, porosity distance to surface, and porosity count.

Example 43: The method of any of Examples 34-42, wherein the derived data comprises wall thickness data comprising a distribution of thicknesses.

Example 44: The method of any of Examples 34-43, wherein the derived data comprises wall thickness data comprising a region specific thickness.

Example 45: The method of any of Examples 34-44, wherein the derived data comprises dimensional deviation data on a primitive-matched feature, wherein the primitive-matched feature is a geometric shape with primitive fit to the X-ray CT scan data.

Example 46: The method of Example 45, wherein the dimensional deviation data on the primitive-matched feature comprises concentricity, alignment, and spacing of the primitive-matched feature.

Example 47: The method of any of Examples 34-46, wherein the derived data comprises inclusions data of one or more inclusions detected in the X-ray CT scan data.

Example 48: The method of Example 47, wherein the inclusions data comprises inclusion location, inclusion size, inclusion shape, inclusion distance to surface, and inclusion count.

Example 49: The method of any of Examples 34-48, wherein the X-ray CT scan data comprises 3D reconstruction data for the scan object, and the derived data comprises multiple slices of the 3D reconstruction data sampled following a coordinate system.

Example 50: The method of Example 49, wherein the coordinate system is derived from a geometric feature extracted from the X-ray CT scan data.

Example 51: The method of any of Examples 34-50, wherein the derived data comprises a series of segmentations of the X-ray CT scan data.

Example 52: The method of Example 51, wherein the series of segmentations are generated using multiple threshold values that segment different materials from the X-ray CT scan data.

Example 53: The method of any of Examples 34-52, wherein the derived data comprises boundary representations of different materials identified in the X-ray CT scan data.

Example 54: The method of any of Examples 34-53, wherein the X-ray CT scan data comprises 3D reconstruction data for the scan object, and the derived data comprises 3D convolutional features generated from the 3D reconstruction data using at least one 3D convolutional filter.

Example 55: The method of any of Examples 34-54, wherein the derived data comprises at least one of voxel data, octree data, a point cloud, a mesh, an implicit function, or spherical harmonics.

Example 56: The method of any of Examples 34-55, wherein the derived data comprises non-planar slices of 3D reconstruction data.

Example 57: The method of any of Examples 34-56, wherein the derived data comprises 2D data and 3D data.

Example 58: The method of any of Examples 34-57, wherein the providing comprises providing the output to a product handling device to make an inline decision on a product handling line based on the at least one anomaly having been detected for the scan object.

Example 59: The method of any of Examples 34-58, wherein the providing comprises rendering to a display device a result based on the at least one anomaly having been detected for the scan object in a user interface on the display device.

Example 60: The method of Example 59, wherein the rendering comprises highlighting a defect or an anomalous region in 2D or 3D in the user interface on the display device.

Example 61: The method of any of Examples 34-60, wherein the machine learning model generates the output that indicates that the at least one anomaly has been detected for the scan object at a computer directly attached to or a part of a CT scanner that generates the CT scan data for the scan object, wherein the computer has no network connectivity.

Example 62: The method of any of Examples 34-61, wherein the providing comprises detecting the scan object as a counterfeit object based on the at least one anomaly having been detected for the scan object.

Example 63: The method of any of Examples 34-61, wherein the providing comprises:

detecting a change based on the at least one anomaly having been detected for the scan object; and outputting the detected change.

Example 64: The method of Example 63, wherein detecting the change comprises detecting the change to a production machine that processes the scan object on a product handling line.

Example 65: The method of Example 64, wherein the change comprises wear and tear of the production machine or a tool of the production machine.

Example 66: The method of Example 64, wherein the change comprises a calibration change of the production machine.

Example 67: The method of Example 64, wherein detecting the change comprises detecting a root cause of where the at least one anomaly occurred in a manufacturing process.

Example 68: The method of Example 64, wherein detecting the change comprises detecting a change in a supply chain.

Example 69: The method of Example 68, wherein detecting the change in the supply chain comprises detecting a change in a vendor.

Example 70: The method of Example 68, wherein detecting the change in the supply chain comprises detecting a change in a parameter of a manufacturing process.

Example 71: The method of Example 68, wherein detecting the change in the supply chain comprises detecting a change in a material.

Example 72: The method of Example 63, wherein detecting the change comprises detecting a drift in product quality over time.

Example 73: The method of Example 63, wherein detecting the change comprises detecting a variance in production lines processing a same type of products.

Example 74: The method of any of Examples 34-73, wherein the providing comprises:

quantifying a production metric based on the at least one anomaly having been detected for the scan object; and outputting the production metric.

Example 75: The method of any of Examples 34-74, wherein the providing comprises assigning an OK/NG label to a universal unique identifier corresponding to the scan object.

Example 76: The method of any of any of Examples 34-75, further comprising:

obtaining a training data set comprising at least the derived data produced from the prior X-ray CT scan data for training objects of the predetermined object type, wherein the derived data produced from the prior X-ray CT scan data reveals at least one interior structure usable for anomaly detection in objects of the predetermined object type; and training the machine learning model on the training data set.

Example 77: The method of Example 76, wherein training the machine learning model comprises:

determining an operation parameter of the machine learning model based on a throughput requirement of a product handling process and a tolerance for incorrectly predicted objects of the product handling process.

Example 78: The method of any of Examples 76 and 77, wherein training the machine learning model comprises:

determining a set of experiments among different types of the derived data produced from the prior X-ray CT scan data, and different machine learning model types;

performing the set of experiments in parallel; and determining the trained machine learning model using an iterative search method based on results of the set of experiments.

Example 79: The method of Example 78, wherein performing the set of experiments in parallel comprises performing the set of experiments in parallel in a cloud computer system, and the machine learning model generates the output that indicates that the at least one anomaly has been detected for the scan object at a computer with no network connectivity.

Example 80: The method of any of Examples 34-79, wherein the machine learning model comprises at least one of a convolutional neural network, an autoencoder, a generative adversarial network, or a vision transformer.

Similar operations and processes as described in Examples 34 to 80 can be performed in a system comprising: at least one processor; and at least one memory storing instructions that, when executed by the at least one processor, cause the apparatus at least to perform the operations and processes. Further, a non-transitory computer readable medium comprising program instructions for anomaly detection that, when executed by an apparatus, cause the apparatus to perform operations as described in any of the Examples 34 to 80 can also be implemented. In some implementations, features of the Examples 34 to 80 can be combined with features from previously presented Examples 1 to 33.

Partial Glossary

2D Two-dimensional
3D Three-dimensional
AI Artificial Intelligence
ASIC Application Specific Integrated Circuit
AUC Area Under Receiver Operating Characteristic
CAD Computed-Aided Design
CNN Convolutional Neural Network
CPU Central Processing Unit
CT Computed Tomography
CV Computer Vision
GAN Generative Adversarial Network
GPU Graphics Processing Unit
NG No Good
NURBS Non-Uniform Rational B-Spline
QR Quick Response
ROC Receiver Operating Characteristic
UI User Interface
UUID Universal Unique Identifier

The invention claimed is:

1. A system comprising:

a data processing apparatus including at least one processor; and a non-transitory computer-readable medium encoding instructions configured to cause the data processing apparatus to perform operations comprising:

obtaining X-ray computed tomography (CT) scan data for a scan object of a predetermined object type, producing derived data comprising multiple views of the scan object generated from the X-ray CT scan data, wherein the derived data reveals at least one interior structure usable for anomaly detection in objects of the predetermined object type, wherein each of the multiple views is from a different location around the scan object, inputting at least the derived data into a machine learning model, which has been trained using at least derived data comprising multiple views of objects produced from prior X-ray CT scan data for the objects of the predetermined object type, receiving an output from the machine learning model that indicates that at least one anomaly has been detected for the scan object, and providing an output to a physical device based on the at least one anomaly having been detected for the scan object, wherein the derived data further comprises: (i) a shape representation of the X-ray CT scan data and (ii) feature data of one or more voids or contaminants detected in the X-ray CT scan data, the shape representation reveals at least one interior structure usable for anomaly detection in objects of the predetermined object type, the feature data of the one or more voids or contaminants reveals at least one interior structure usable for anomaly detection in objects of the predetermined object type, and the machine learning model has been trained using at least the derived data comprising (i) the multiple views of objects, (ii) shape representations, and (iii) feature data of voids or contaminants produced from the prior X-ray CT scan data for the objects of the predetermined object type.

2. The system of claim 1, wherein the shape representation represents information about material properties of the scan object.

3. The system of claim 1, wherein the producing comprises generating the shape representation using a segmentation method that is based on a structural property of the X-ray CT scan data.

4. The system of claim 1, wherein the shape representation comprises a series of segmentations of the X-ray CT scan data, wherein the series of segmentations are generated using multiple threshold values that segment different materials from the X-ray CT scan data.

5. The system of claim 1, wherein the derived data comprises dimensional deviation data on a primitive-matched feature, wherein the primitive-matched feature is a geometric shape with primitive fit to the X-ray CT scan data.

6. The system of claim 5, wherein the machine learning model generates the output that indicates the at least one anomaly by processing the dimensional deviation data on the primitive-match feature using a quality criterion that describes allowable variation of the dimensional deviation data.

7. The system of claim 5, wherein the dimensional deviation data on the primitive-matched feature comprises concentricity, alignment, and spacing of the primitive-matched feature.

8. The system of claim 5, wherein the producing comprises:

determining a deviation type of the primitive-matched feature based on the predetermined object type of the scan object; and generating, based on the deviation type of the primitive-matched feature, the dimensional deviation data on the primitive-matched feature.

9. The system of claim 5, wherein the dimensional deviation data on the primitive-matched feature comprises a plane-to-plane distance.

10. The system of claim 1, wherein the providing comprises detecting the scan object as a counterfeit object based on the at least one anomaly having been detected for the scan object.

11. The system of claim 1, wherein the providing comprises:

detecting a change to a production machine that processes the scan object on a product handling line based on the at least one anomaly having been detected for the scan object; and outputting the detected change to the production machine.

12. The system of claim 11, wherein detecting the change to the production machine comprises detecting wear and tear of a tool of the production machine.

13. The system of claim 1, wherein the X-ray CT scan data comprises three-dimensional (3D) reconstruction data for the scan object, and the multiple views are rendered views of the 3D reconstruction data produced using a rendering setting that accentuates material differences.

14. The system of claim 1, wherein each different location around the scan object is specified by a vertex of a polyhedron.

15. The system of claim 1, wherein the scan object is an assembly comprising two or more parts, and the providing comprises performing assembly verification based on the at least one anomaly having been detected for the scan object.

16. The system of claim 1, wherein the providing comprises:

detecting a change in a supply chain based on the at least one anomaly having been detected for the scan object; and outputting the detected change in the supply chain.

17. The system of claim 1, wherein the providing comprises: processing the at least one anomaly using a classifier to determine an anomaly type from a predetermined number of anomaly types for the at least one anomaly.

18. The system of claim 1, wherein the providing comprises:

detecting a variance in production lines processing a same type of products; and outputting the detected variance in the production lines.

19. A system, comprising:

a data processing apparatus including at least one processor; and a non-transitory computer-readable medium encoding instructions configured to cause the data processing apparatus to perform operations comprising:

obtaining X-ray computed tomography (CT) scan data for a scan object of a predetermined object type, producing derived data comprising multiple views of the scan object generated from the X-ray CT scan data, wherein the derived data reveals at least one interior structure usable for anomaly detection in objects of the predetermined object type, wherein each of the multiple views is from a different location around the scan object, inputting at least the derived data into a machine learning model, which has been trained using at least derived data comprising multiple views of objects produced from prior X-ray CT scan data for the objects of the predetermined object type, receiving an output from the machine learning model that indicates that at least one anomaly has been detected for the scan object, providing an output to a physical device based on the at least one anomaly having been detected for the scan object, obtaining a training data set comprising at least the derived data produced from the prior X-ray CT scan data for training objects of the predetermined object type, wherein the derived data produced from the prior X-ray CT scan data reveals at least one interior structure usable for anomaly detection in objects of the predetermined object type, training the machine learning model on the training data set to form a trained machine learning model, and determining an operation parameter of the trained machine learning model based on a throughput requirement of a product handling process and a tolerance for incorrectly predicted objects of the product handling process.

20. The system of claim 19, wherein the X-ray CT scan data comprises three-dimensional (3D) reconstruction data for the scan object, and the multiple views are rendered views of the 3D reconstruction data produced using a rendering setting that accentuates material differences.

21. The system of claim 19, wherein each different location around the scan object is specified by a vertex of a polyhedron.

22. The system of claim 19, wherein the providing comprises: processing the at least one anomaly using a classifier to determine an anomaly type from a predetermined number of anomaly types for the at least one anomaly.

23. A non-transitory computer-readable medium encoding instructions operable to cause data processing apparatus to perform operations comprising:

obtaining X-ray computed tomography (CT) scan data for a scan object of a predetermined object type;

producing derived data comprising feature data of one or more voids or contaminants detected in the X-ray CT scan data, wherein the feature data of the one or more voids or contaminants reveals at least one interior structure usable for anomaly detection in objects of the predetermined object type;

inputting at least the derived data into a machine learning model, which has been trained using at least derived data comprising feature data of voids or contaminants detected in prior X-ray CT scan data for objects of the predetermined object type;

receiving an output from the machine learning model that indicates that at least one anomaly has been detected for the scan object; and providing an output to a physical device based on the at least one anomaly having been detected for the scan object, wherein the output to the physical device causes a change in an upstream process or a change in a vendor in a supply chain determined based on the at least one anomaly, wherein the one or more voids or contaminants comprise one or more inclusions detected in the X-ray CT scan data, the feature data comprising inclusion data of the one or more inclusions, wherein the scan object was manufactured using an injection molding process, and the output to the physical device comprises data characterizing agglomerations in the injection molding process of fiber-filled resins.

24. The non-transitory computer-readable medium of claim 23, wherein the one or more voids or contaminants comprise one or more pores detected in the X-ray CT scan data, the feature data comprising porosity data of the one or more pores, wherein the scan object was manufactured by molding, bonding, or sealing.

25. The non-transitory computer-readable medium of claim 23, wherein the feature data comprises location data of at least one of the one or more voids or contaminants.

26. The non-transitory computer-readable medium of claim 23, wherein the feature data comprises size data of at least one of the one or more voids or contaminants.

27. The non-transitory computer-readable medium of claim 23, wherein the feature data comprises shape data of at least one of the one or more voids or contaminants.

28. The non-transitory computer-readable medium of claim 23, wherein the feature data comprises distance to surface data of at least one of the one or more voids or contaminants.

29. The non-transitory computer-readable medium of claim 23, wherein the feature data comprises a count of the one or more voids or contaminants.

30. The non-transitory computer-readable medium of claim 23, wherein the feature data comprises sphericity data of at least one of the one or more voids or contaminants.

* * * * *